(12) United States Patent
Saito

(10) Patent No.: US 8,562,534 B2
(45) Date of Patent: Oct. 22, 2013

(54) ULTRASONIC PROBE

(75) Inventor: Koetsu Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 1121 days.

(21) Appl. No.: 12/298,646

(22) PCT Filed: Apr. 27, 2007

(86) PCT No.: PCT/JP2007/059221
§ 371 (c)(1),
(2), (4) Date: Oct. 27, 2008

(87) PCT Pub. No.: WO2007/126069
PCT Pub. Date: Nov. 8, 2007

(65) Prior Publication Data
US 2009/0069691 A1    Mar. 12, 2009

(30) Foreign Application Priority Data
Apr. 28, 2006   (JP) .................................. 2006-125536

(51) Int. Cl.
*A61B 8/00*   (2006.01)
(52) U.S. Cl.
USPC ........... 600/459; 600/437; 600/443; 310/322; 310/326; 310/334
(58) Field of Classification Search
USPC .......... 600/437, 160, 443, 459; 310/334, 358, 310/322, 326
See application file for complete search history.

(56) References Cited

U.S. PATENT DOCUMENTS

| | | | |
|---|---|---|---|
| 4,628,223 A * | 12/1986 | Takeuchi et al. | 310/358 |
| 4,672,591 A | 6/1987 | Breimesser et al. | |
| 5,327,895 A | 7/1994 | Hashimoto et al. | |
| 5,415,175 A | 5/1995 | Hanafy et al. | |
| 5,423,220 A | 6/1995 | Finsterwald et al. | |
| 5,637,800 A | 6/1997 | Finsterwald et al. | |
| 5,743,855 A | 4/1998 | Hanafy et al. | |
| 6,020,675 A | 2/2000 | Yamashita et al. | |
| 2001/0021807 A1 * | 9/2001 | Saito et al. | 600/437 |
| 2001/0041837 A1 | 11/2001 | Takeuchi et al. | |
| 2003/0187356 A1 * | 10/2003 | Wakabayashi et al. | 600/437 |
| 2003/0189391 A1 * | 10/2003 | Shimizu | 310/334 |
| 2005/0261590 A1 * | 11/2005 | Ogawa et al. | 600/459 |
| 2006/0009681 A1 * | 1/2006 | Tanaka et al. | 600/160 |
| 2009/0062655 A1 * | 3/2009 | Saito | 600/459 |

FOREIGN PATENT DOCUMENTS

| | | |
|---|---|---|
| JP | 61-170199 | 7/1986 |
| JP | 5-228142 | 9/1993 |
| JP | 7-107595 | 4/1995 |
| JP | 8-506227 | 7/1996 |

(Continued)

OTHER PUBLICATIONS

English Language Abstract of JP 8-506227; Jul. 2, 1996.

(Continued)

*Primary Examiner* — Baisakhi Roy
(74) *Attorney, Agent, or Firm* — Greenblum & Bernstein, P.L.C.

(57) ABSTRACT

Provided is an ultrasonic probe, which can be improved in quality, which can acquire characteristics of a high sensitivity and a wide band and which can acquire an ultrasonic image of a high resolution. In this ultrasonic probe, grooves (160) are formed and utilized to form piezoelectric elements (110) and first acoustic matching layers (121) in a curved shape thereby to converge ultrasonic waves without any acoustic lens. Moreover, signal conductors (150) are disposed on the signal electrode faces of the piezoelectric elements (110).

57 Claims, 6 Drawing Sheets

(56) References Cited

FOREIGN PATENT DOCUMENTS

| | | |
|---|---|---|
| JP | 9-84194 | 3/1997 |
| JP | 11-113907 | 4/1999 |
| JP | 2000-14672 | 1/2000 |
| JP | 2001-298795 | 10/2001 |
| RU | 2070840 | 12/1996 |
| RU | 48824 | 11/2005 |

OTHER PUBLICATIONS

Russian Office action, dated Aug. 27, 2010, along with an english translation thereof.

* cited by examiner

US 8,562,534 B2

ULTRASONIC PROBE

TECHNICAL FIELD

The present invention relates to an ultrasonic probe that is used to obtain diagnostic information about a test subject by sending an ultrasonic wave to a test subject such as a living organism.

BACKGROUND ART

An ultrasonic diagnostic apparatus provides information necessary for diagnosis of a test subject by radiating an ultrasonic wave into an organic test subject such as a human being or animal, detecting an echo reflected inside the test subject, and displaying a tomogram or the like of tissue inside the living organism. At this time, the ultrasonic diagnostic apparatus uses an ultrasonic probe for ultrasonic wave transmission into the test subject and reception of a reflected echo from inside the test subject.

FIG. 1 shows an example of this kind of ultrasonic probe. In FIG. 1, ultrasonic probe 10 is composed of a plurality of piezoelectric elements 11 arrayed in one direction (the X direction) for transmitting and receiving ultrasonic waves to/from a test subject (not shown), acoustic matching layers 12 comprising one or more layers (in FIG. 1, two layers 12a and 12b) provided on the test-subject-side front surfaces (at the top in FIG. 1) of piezoelectric elements 11, propagating medium 13 provided on the test-subject-side surface of these acoustic matching layers 12, and rear-surface backing material 14 provided on the rear surface forming the opposite side of acoustic matching layers 12 with respect to piezoelectric elements 11. Electrodes (not shown) are arrayed on the front surfaces and rear surfaces of piezoelectric elements 11. Electrical signals are supplied to piezoelectric elements 11 via these electrodes and electrical terminals 15. In piezoelectric elements 11, a plurality of grooves are formed from the acoustic matching layer 12 side, being formed into a concave shape in the direction (Y direction) orthogonal to the array direction (X direction) (see Patent Document 1, for example).

Piezoelectric elements 11 are formed from a PZT or similar type of piezoelectric ceramic, a piezoelectric monocrystal, or the like, convert an applied voltage to an ultrasonic wave and transmit this into a test subject, and receive an echo reflected from inside the test subject and convert this to an electrical signal. In the example shown in FIG. 1, a plurality of piezoelectric elements 11 are arrayed in the X direction. Arraying a plurality of piezoelectric elements 11 in this way enables ultrasonic waves to be electronically scanned and deflected or converged, making so-called electronic scanning possible.

Acoustic matching layers 12 are provided to transmit and receive ultrasonic waves efficiently inside a test subject. More specifically, acoustic matching layers 12 have a role of bringing the acoustic impedance of piezoelectric elements 11 close to the acoustic impedance of a test subject in steps.

In the example shown in FIG. 1, piezoelectric elements 11 and acoustic matching layers 12 are formed into a concave shape on the test subject side, and therefore have a function of focusing an ultrasonic wave beam, but since adhesion to a test subject is inadequate due to the concave shape, the configuration is provided with propagating medium 13 that includes a role of eliminating this inadequacy. Propagating medium 13 is an optional element, being provided as necessary.

Rear-surface backing material 14 is bonded to piezoelectric elements 11 and supports them, and also has a role of attenuating unwanted ultrasonic waves. In this specification, the X direction in a drawing may also be referred to as "the (piezoelectric element) array direction", the Y direction as "the (piezoelectric element) width direction", and the Z direction as "the (piezoelectric element) thickness direction".

Patent Document 1: National Publication of International Patent Application No. HEI 8-506227

DISCLOSURE OF INVENTION

Problems to be Solved by the Invention

An electronic-scanning ultrasonic diagnostic apparatus makes a plurality of arrayed piezoelectric elements into an arbitrary group and performs drive with a fixed delay time provided to individual piezoelectric elements, and performs transmission and reception of ultrasonic waves inside a test subject from the piezoelectric elements. By providing such a delay time, ultrasonic wave beams are converged or diffused, and an ultrasonic image with a wide field of view or high definition can be obtained. This configuration is already known as a general system. In recent years, a method has been used whereby the resolution of a diagnostic image of an ultrasonic diagnostic apparatus is increased using a second- or third-harmonic frequency component for a basic frequency, and it is therefore extremely important to provide an ultrasonic probe with high sensitivity and a wide frequency band. One method of providing a wide frequency band is to use a composite piezoelectric body combining a piezoelectric ceramic and a high polymer as a piezoelectric element such as shown in Patent Document 1. And one method of achieving high sensitivity is to reduce the attenuation of a silicone rubber or suchlike acoustic lens, one such method being to form a piezoelectric element into a concave shape and provide a polyurethane polymer having low attenuation in the concave part, as shown in Patent Document 1.

However, in this kind of conventional configuration, electrical terminals 15 extending from the electrodes of arrayed piezoelectric elements 11 are connected to only part of the piezoelectric element 11 electrodes, and therefore if piezoelectric elements 11 break due to a mechanical impact, connection to electrical terminals 15 may be severed, raising a concern about reliability (quality). Also, in an above conventional configuration, a configuration is employed in which a composite piezoelectric body of a piezoelectric ceramic and a high polymer and two acoustic matching layers are provided and each formed into a concave shape, and therefore usable materials are limited to flexible materials, restricting the implementation of a wide frequency band. One possible method of achieving a wider band with this configuration is to lower the acoustic impedance by reducing the proportion of piezoelectric ceramic in the composite piezoelectric body, but a problem in this case is that the permittivity of the composite piezoelectric body decreases, resulting in an increase in electrical impedance, and thus lower sensitivity.

It is an object of the present invention to provide an ultrasonic probe of high quality that enables characteristics of high sensitivity and a wide band to be obtained, and enables a high-resolution ultrasonic image to be obtained.

Means for Solving the Problems

An ultrasonic probe of the present invention employs a configuration having: a piezoelectric element, a plurality of which are arrayed in a predetermined direction, with electrodes provided on both surfaces that transmit and receive an ultrasonic wave; at least two or more acoustic matching layers provided on one surface of the piezoelectric element; a plurality of first grooves that are provided in the piezoelectric element and at least a first acoustic matching layer on the piezoelectric element among the two or more acoustic matching layers, and divide at least the piezoelectric element in a lengthwise direction orthogonal to an array direction of the piezoelectric element; a signal conductor provided on a surface on the opposite side from the one surface of the piezoelectric element; and a plurality of second grooves that separate at least the first acoustic matching layer among the two or more acoustic matching layers, the piezoelectric element, and the signal conductor in the array direction of the piezoelectric element; wherein the acoustic matching layer, the piezoelectric element, and the signal conductor are formed into a curved surface shape in the lengthwise direction of the piezoelectric element.

An ultrasonic probe of the present invention employs a configuration having: a piezoelectric element, a plurality of which are arrayed in a predetermined direction, with electrodes provided on both surfaces that transmit and receive an ultrasonic wave; at least two or more acoustic matching layers provided on one surface of the piezoelectric element; a plurality of first grooves that are provided in the piezoelectric element and at least a first acoustic matching layer on the piezoelectric element among the two or more acoustic matching layers from the side opposite the acoustic matching layer side, and divide at least the piezoelectric element in a lengthwise direction orthogonal to an array direction of the piezoelectric element; a signal conductor provided on a surface on the opposite side from the one surface of the piezoelectric element; a rear-surface backing material that supports the acoustic matching layer, the piezoelectric element, and the signal conductor; and a plurality of second grooves that separate at least the first acoustic matching layer among the two or more acoustic matching layers, the piezoelectric element, and the signal conductor in the array direction of the piezoelectric element; wherein the acoustic matching layer, the piezoelectric element, and the signal conductor are formed into a curved surface shape in the lengthwise direction of the piezoelectric element.

An ultrasonic probe of the present invention employs a configuration having: a piezoelectric element, a plurality of which are arrayed in a predetermined direction, with electrodes provided on both surfaces that transmit and receive an ultrasonic wave; a first acoustic matching layer provided on one surface of the piezoelectric element; a grounding conductor provided on the first acoustic matching layer; a second acoustic matching layer provided on the grounding conductor; a plurality of first grooves that are provided in the piezoelectric element and at least the first acoustic matching layer, and divide at least the piezoelectric element in a lengthwise direction orthogonal to an array direction of the piezoelectric element; a signal conductor provided on a surface on the opposite side from the one surface of the piezoelectric element; a rear-surface backing material that supports the two acoustic matching layers, the grounding conductor, the piezoelectric element, and the signal conductor; and a plurality of second grooves that separate at least the first acoustic matching layer of the two acoustic matching layers, the grounding conductor, the piezoelectric element, and the signal conductor in the array direction of the piezoelectric element; wherein the two acoustic matching layers, the grounding conductor, the piezoelectric element, and the signal conductor are formed into a curved surface shape in the lengthwise direction of the piezoelectric element.

An ultrasonic probe of the present invention employs a configuration having: a piezoelectric element, a plurality of which are arrayed in a predetermined direction, with electrodes provided on both surfaces that transmit and receive an ultrasonic wave; a first acoustic matching layer provided on one surface of the piezoelectric element; a grounding conductor provided on the first acoustic matching layer; a second acoustic matching layer provided on the grounding conductor; a third acoustic matching layer provided on the second acoustic matching layer; a plurality of first grooves that are provided in the piezoelectric element and at least the first acoustic matching layer, and divide at least the piezoelectric element in a lengthwise direction orthogonal to an array direction of the piezoelectric element; a signal conductor provided on a surface on the opposite side from the one surface of the piezoelectric element; a rear-surface backing material that supports the three acoustic matching layers, the grounding conductor, the piezoelectric element, and the signal conductor; and a plurality of second grooves that separate at least the first acoustic matching layer among the three acoustic matching layers, the grounding conductor, the piezoelectric element, and the signal conductor in the array direction of the piezoelectric element; wherein the three acoustic matching layers, the grounding conductor, the piezoelectric element, and the signal conductor are formed into a curved surface shape in the lengthwise direction of the piezoelectric element.

Advantageous Effect of the Invention

The present invention enables quality to be improved, enables characteristics of high sensitivity and a wide band to be obtained, and enables a high-resolution ultrasonic image to be obtained.

That is to say, a plurality of grooves are provided in a piezoelectric element and a first acoustic matching layer in a lengthwise direction (Y direction) orthogonal to the piezoelectric element array direction (X direction) and a signal conductor is provided on the piezoelectric element thickness direction (Z direction) rear surface, and the acoustic matching layer, piezoelectric element, and signal conductor are formed into a curved surface shape in the Y direction, enabling high reliability, high sensitivity, a wide band, and high resolution to be obtained.

BEST MODE FOR CARRYING OUT THE INVENTION

Embodiments of the present invention will now be described in detail with reference to the accompanying drawings.

Embodiment 1

Figure 2A:
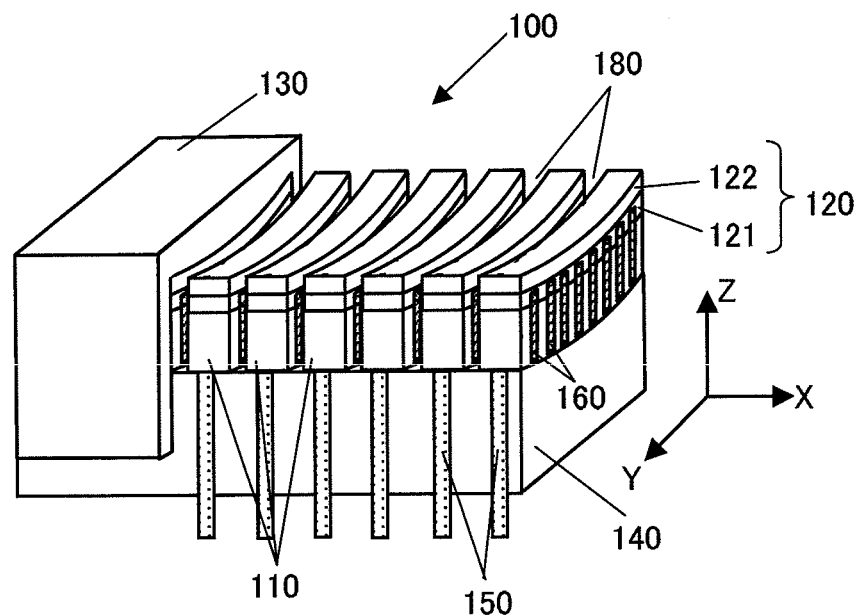
FIG. 2A is a partial schematic perspective view of an ultrasonic probe according to Embodiment 1 of the present invention.
Figure 2B:
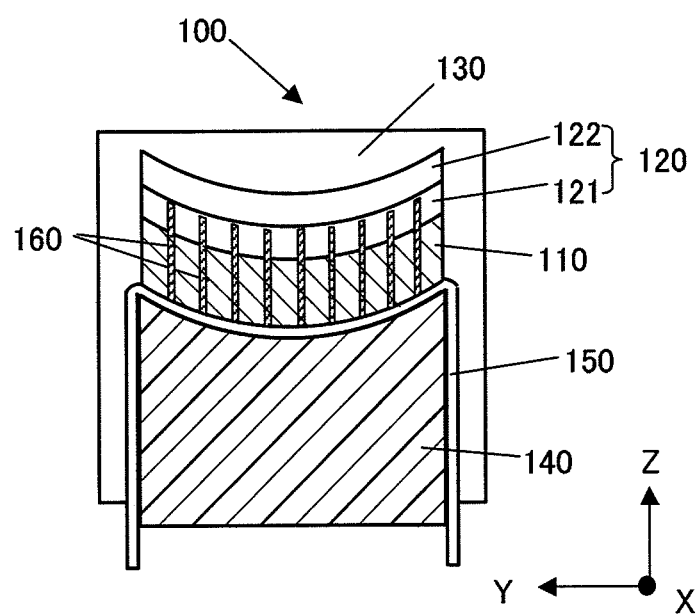
FIG. 2B is a schematic cross-sectional diagram of the ultrasonic probe shown in FIG. 2A viewed from the X direction.

FIG. 2A is a partial schematic perspective view of an ultrasonic probe according to Embodiment 1 of the present invention, and FIG. 2B is a schematic cross-sectional diagram of the ultrasonic probe shown in FIG. 2A viewed from the X direction.

Figure 1:
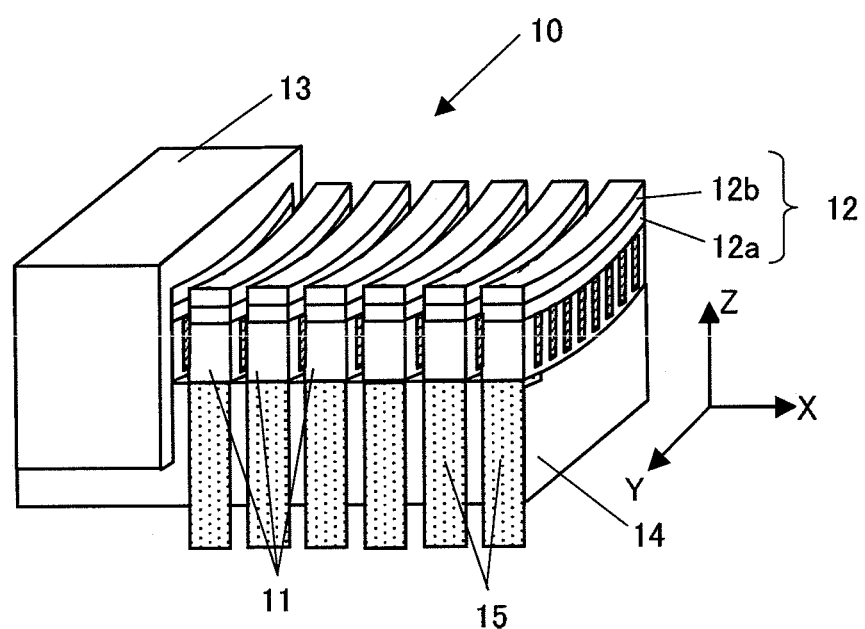
FIG. 1 is a schematic perspective view showing an example of the configuration of a conventional ultrasonic probe.

Ultrasonic probe 100 shown in FIG. 2A and FIG. 2B is composed of a plurality of piezoelectric elements 110 arrayed in one direction (the X direction), two acoustic matching layers 120 (121, 122) provided on the thickness-direction (Z-direction) front surface on the test subject side (at the top in FIG. 2A and FIG. 2B) of each piezoelectric element 110, rear-surface backing material 140 provided as necessary on the thickness-direction (Z-direction) rear surface (at the bottom in FIG. 2A and FIG. 2B), on the opposite side of piezoelectric elements 110 from acoustic matching layers 120 (121, 122), and propagating medium 130 provided on acoustic matching layers 120 (121, 122) as necessary. The functions of these configuration elements are the same as those described in the conventional technology shown in FIG. 1.

A ground electrode (not shown) is provided on the piezoelectric element 110 thickness-direction (Z-direction) front surface, and a signal electrode (not shown) on the rear surface. The two electrodes are formed on the front surface and rear surface respectively of piezoelectric elements 110 by means of gold or silver vapor deposition or sputtering, silver plating, or the like.

The configuration of ultrasonic probe 100 will now be described in greater detail.

Piezoelectric elements 110 are formed using a PZT or similar type of piezoelectric ceramic, a PZN-PT, PMN-PT, or similar type of piezoelectric monocrystal, or the like. First acoustic matching layer 121 and second acoustic matching layer 122 are provided on the side of a ground electrode (not shown) provided on each piezoelectric element 110 of such a material. Piezoelectric element 110 and first acoustic matching layer 121 are provided with a plurality of grooves 160 as first grooves of the present invention, running in the X direction from the piezoelectric element 110 surface on the side opposite the side on which first acoustic matching layer 121 is provided. These grooves 160 are provided using a dicing machine or suchlike apparatus, for example. These grooves 160 pierce both sides (the front and rear sides) of piezoelectric element 110 in the Z direction and completely divide piezoelectric element 110, but pierce only one side of the two Z-direction sides of first acoustic matching layer 121. That is to say, as regards first acoustic matching layer 121, grooves 160 are provided so as to leave part of the portion located on the side opposite the piezoelectric element 110 side from the piezoelectric element 110 side surface.

The reason for leaving part of first acoustic matching layer 121 here is to perform extension of an electrical terminal (not shown) from a ground electrode of divided piezoelectric element 110 at the Y-direction end only. For this reason, it is necessary for first acoustic matching layer 121 to be an electrical conductor. Therefore, graphite, or a material made a conductor by filling a high polymer with metallic powder (such as an electrically conductive adhesive), for example, may be used for first acoustic matching layer 121. It is, of course, necessary for first acoustic matching layer 121 to have an acoustic impedance value between those of piezoelectric element 110 and a test subject (living organism).

Grooves 160 provided in piezoelectric element 110 and first acoustic matching layer 121 may be equally or randomly spaced. However, with regard to the material of piezoelectric element 110—for example, PZT piezoelectric ceramic—apart from a used thickness longitudinal oscillation mode, an unwanted latitudinal oscillation mode occurs, and this latitudinal oscillation mode has an adverse effect on a frequency characteristic and so forth. Therefore, it is necessary for the piezoelectric ceramic width to be made narrow—that is, for the intervals of grooves 160 to be made narrow—so that the latitudinal oscillation mode frequency is outside the used frequency range.

Also, by forming piezoelectric element 110 using a PZT piezoelectric ceramic, providing grooves 160 in this piezoelectric element 110, and filling these grooves 160 with a polymeric material such as epoxy resin or polyurethane resin, piezoelectric element 110 is given a function of a composite piezoelectric body combining a piezoelectric ceramic and a polymeric material. That is to say, by filling part of grooves 160 in piezoelectric element 110 with a polymeric material having small acoustic impedance, the acoustic impedance of piezoelectric element 110 can be made smaller than that of a piezoelectric ceramic, and can be made to approach the acoustic impedance of a test subject. By this means, implementation of a wide frequency band becomes possible. The acoustic impedance value of this composite piezoelectric body can be changed by changing the volumetric proportions of piezoelectric ceramic and polymeric material.

Meanwhile, with regard to the permittivity of a composite piezoelectric body, since the permittivity of a polymeric material is far smaller than the permittivity of a piezoelectric ceramic, if the volumetric proportion of piezoelectric ceramic is reduced, the permittivity of the composite piezoelectric body decreases, and its electrical impedance increases. As a result, a mismatch occurs with a connected ultrasonic diagnostic apparatus or cable, leading to a fall in sensitivity. Therefore, the volumetric proportion of piezoelectric ceramic used in a composite piezoelectric body is generally in a range of 50 to 75%.

As with piezoelectric element 110, first acoustic matching layer 121 is also provided with grooves 160, and these grooves 160 are filled with a polymeric material, so that first acoustic matching layer 121 becomes a composite body, and its acoustic impedance changes (falls). It is therefore necessary to take this fall into consideration when selecting the material of first acoustic matching layer 121.

When grooves 160 in divided piezoelectric element 110 and first acoustic matching layer 121 are filled with a polymeric material (for example, epoxy resin), signal electrical terminal (hereinafter referred to as "signal conductor") 150 is pressed against rear-surface backing material 140 formed into a curved surface shape, and is formed into a curved surface shape together with piezoelectric element 110, first acoustic matching layer 121, and second acoustic matching layer 122.

In this embodiment, as shown in FIG. 2A and FIG. 2B, a configuration is used in which rear-surface backing material 140, piezoelectric element 110, first acoustic matching layer 121, and second acoustic matching layer 122 are formed into a concave curved surface shape on the test subject side, so as to converge ultrasonic waves, but the curved surface shape is not limited to this. For example, a convex shape that diffuses ultrasonic waves may be used.

Since piezoelectric element 110 made of piezoelectric ceramic, and first acoustic matching layer 121 made of graphite or a material such as graphite filled with a metallic powder, intrinsically do not have flexibility allowing curving, forming them into a curved surface shape requires the preparation of items processed into a curved surface shape beforehand, and precision forming is difficult. Therefore, a point of this embodiment is that a configuration allowing curving is achieved by providing grooves 160. Also, a polymeric film having flexibility allowing curving, such as epoxy resin or polyimide, may be used for second acoustic matching layer 122.

Signal conductor 150 may also be configured as an all-over conductor with no patterning of the area on which piezoelectric element 110 is provided, or may be configured so that only a part extended on both sides of ultrasonic probe 100 in the Y direction is patterned. A metallic material such as copper may be used for signal conductor 150, with a thickness of around 10 microns (μm). If a copper or suchlike metallic conductive element lacks strength in terms of handling, a configuration may be used in which a polyimide film approximately 10 to 25 microns (μm) thick is provided. This kind of signal conductor 150 is flexible, and can therefore achieve close contact and electrical conductivity with a signal electrode of piezoelectric element 110 divided by the provision of grooves 160 even if curved. Also, using this kind of signal conductor 150 means that, even if piezoelectric element 110 cracks, signal conductor 150 will not break due to its flexibility, and thus reliability (quality) is improved. Compared with a configuration in which an electrical terminal is connected to only part of an electrode of a piezoelectric element such as shown in Patent Document 1, this configuration enables a solution to be provided to such problems as an electrode being split and breaking through cracking of a piezoelectric element due to a mechanical impact from an external source.

The curvature of curved surface forming can be changed according to where the focal distance of ultrasonic waves is set. Also, a formed curved surface may have a single radius of curvature, or may have a radius of curvature that changes gradually in the Y direction in FIG. 2A and FIG. 2B.

Acoustic matching layers 120 (first acoustic matching layer 121 and second acoustic matching layer 122) piezoelectric element 110, and signal conductor 150 are divided into a sequence of a plurality of piezoelectric elements by a plurality of dividing grooves 180 as second grooves of the present invention. That is to say, in this embodiment, after signal conductor 150, piezoelectric element 110, first acoustic matching layer 121, and second acoustic matching layer 122 have been pressed against rear-surface backing material 140 formed into a curved surface shape, and have been formed into a curved surface shape, second acoustic matching layer 122, first acoustic matching layer 121, piezoelectric element 110, signal conductor 150, and part of rear-surface backing material 140 are divided into a sequence of a plurality of piezoelectric elements by the above plurality of dividing grooves 180 in line with the signal conductor 150 pattern in the X direction (a direction orthogonal to the Y direction). This direction is the electronic scanning direction. The plurality of dividing grooves 180 are filled with a material such as silicone rubber with lower hardness than the epoxy resin or suchlike material filling grooves 160.

With regard to the material that fills grooves 160, since a plurality of piezoelectric bodies (individual parts of piezoelectric element 110 divided by grooves 160) arrayed in the Y direction are made to oscillate integrally, there is no problem if the oscillation of the individual Y-direction piezoelectric bodies leaks via the filling material such as epoxy resin filling grooves 160, and therefore the filling material of grooves 160 may be of a high degree of hardness. However, with regard to the sequence of a plurality of piezoelectric elements 110 divided in the X direction, when electrical signals are supplied to piezoelectric elements 110 via signal conductors 150, respective delays are applied to perform phase control of the electrical signals and deflect or converge the ultrasonic waves, and therefore it is necessary to keep leakage of ultrasonic wave oscillation between piezoelectric elements 110 small. Therefore, it is necessary for the filling material of dividing grooves 180 dividing signal conductor 150, piezoelectric element 110, first acoustic matching layer 121, and second acoustic matching layer 122 in the X direction to be a material of lower hardness, and less prone to transmission of oscillation, than the filling material of grooves 160 dividing piezoelectric element 110 in the Y direction.

Piezoelectric elements 110 (or to be more exact, the individual piezoelectric bodies) are columnar in shape through being divided in the X direction and Y direction in FIG. 2A and FIG. 2B, and the division intervals in both these directions should be approximately the same. As stated above, an unwanted latitudinal oscillation mode occurs in the piezoelectric ceramic of piezoelectric element 110, and if the piezoelectric ceramic width is made a width at which a latitudinal oscillation mode occurs in the used frequency band, an adverse effect (for example, narrowing of the frequency band) is produced on the used frequency characteristic, so that it is necessary to provide for the latitudinal oscillation mode to be outside the used frequency band. The same also applies to the X direction. Therefore, the effects of an unwanted latitudinal oscillation mode can be reduced by making the X-direction division intervals of piezoelectric element 110 approximately the same, in the same way as in the Y direction.

Lastly, propagating medium 130 is provided on second acoustic matching layer 122 as necessary. Polyurethane resin, butadiene rubber, silicone rubber, or the like, having an acoustic impedance value close to that of a living organism and a small ultrasonic wave attenuation coefficient, may be used for propagating medium 130. Also, since ultrasonic waves are refracted at the boundary if the sonic speed of propagating medium 130 differs from the sonic speed of a living organism, it is necessary to take this refraction into consideration as well as taking the curved surface shape of second acoustic matching layer 122 into consideration when setting the focal distance of ultrasonic waves.

Thus, according to this embodiment, a configuration is employed in which grooves 160 are provided and these are used to form piezoelectric element 110 and first acoustic matching layer 121 into a curved surface shape, enabling ultrasonic waves to be converged without an acoustic lens, and a configuration is employed in which signal conductor 150 is provided on a signal electrode surface of piezoelectric element 110. Consequently, a configuration can be implemented that enables high sensitivity and wideband frequency characteristics to be obtained and high reliability to be achieved, making it possible to implement a high-quality, stable ultrasonic probe. Furthermore, an ultrasonic wave beam can be narrowly focused, and an ultrasonic wave beam can be deflected, enabling an ultrasonic probe to be implemented that provides a high-resolution ultrasonic image with high sensitivity.

In this embodiment, a case has been described in which piezoelectric elements 110 are arrayed linearly (in a planar configuration) in the X direction, but the shape of the X-direction array is not limited to this. For example, the same kind of effect can also be obtained if piezoelectric elements are arrayed in a convex or concave curved surface shape in the X direction.

In this embodiment, a case has been described in which a conductive material is used for first acoustic matching layer 121, but the present invention is not limited to this. For example, the same kind of effect can also be obtained if the first acoustic matching layer is a composite body comprising an insulator and a conductor, the first acoustic matching layer is divided by first grooves (grooves 160) in the Y direction, and a conductor is provided on part of the first acoustic matching layer so that the divided parts become electrically conductive in the Z direction.

In this embodiment, a case has been described in which piezoelectric element 110 and acoustic matching layers 120 are formed into a concave curved surface shape in the Y direction on the test subject side, but the curved surface shape is not limited to this. For example, the same kind of effect can also be obtained if the piezoelectric element and acoustic matching layers are made convex in the Y direction on the test subject side, and also if a curved surface having a single radius of curvature or a curved surface having a plurality of radii of curvature such that the radius of curvature changes gradually is used, irrespective of concavity or convexity.

In this embodiment, a case has been described in which piezoelectric element 110 and acoustic matching layers 120 have approximately uniform thickness in the Y direction, but the present invention is not limited to this.

For example, the same kind of effect can also be obtained if the thickness of the piezoelectric element and acoustic matching layers is varied in the Y direction.

Embodiment 2

Embodiment 2 is a case in which a grounding conductor is provided on a first acoustic matching layer instead of a grounding electrical terminal (not shown) according to Embodiment 1.

Figure 3A:
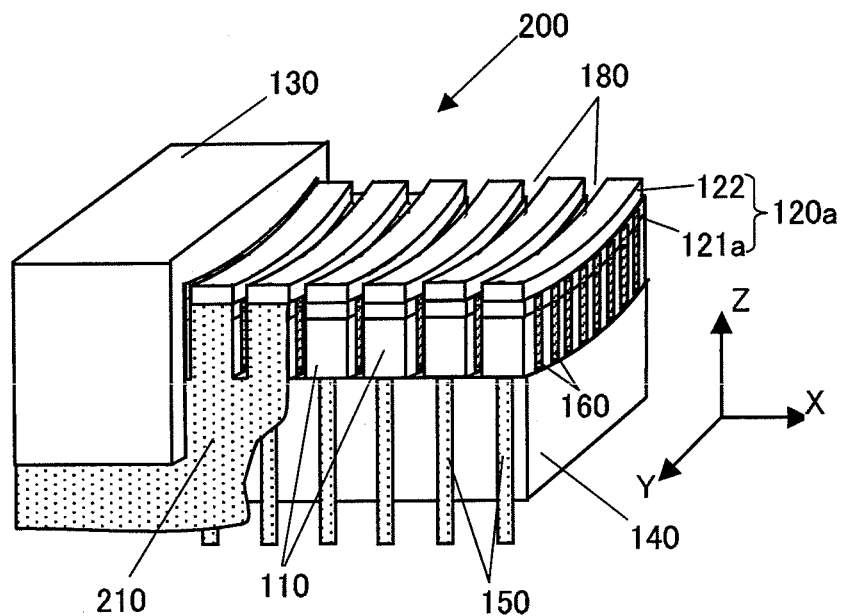
FIG. 3A is a partial schematic perspective view of an ultrasonic probe according to Embodiment 2 of the present invention.
Figure 3B:
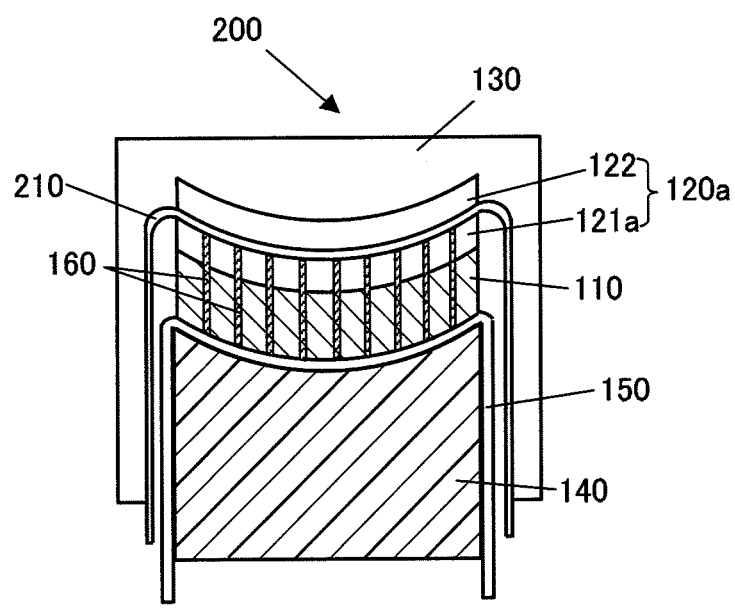
FIG. 3B is a schematic cross-sectional diagram of the ultrasonic probe shown in FIG. 3A viewed from the X direction.

FIG. 3A is a partial schematic perspective view of an ultrasonic probe according to Embodiment 2 of the present invention, and FIG. 3B is a schematic cross-sectional diagram of the ultrasonic probe shown in FIG. 3A viewed from the X direction. This ultrasonic probe has a similar basic configuration to an ultrasonic probe according to Embodiment 1 shown in FIG. 2A and FIG. 2B, and identical configuration elements are assigned the same reference codes.

Ultrasonic probe 200 shown in FIG. 3A and FIG. 3B is composed of a plurality of piezoelectric elements 110 arrayed, in one direction (the X direction), two acoustic matching layers 120a (121a, 122) provided on the thickness-direction (Z-direction) front surface on the test subject side (at the top in FIG. 3A and FIG. 3B) of each piezoelectric element 110, grounding conductor 210 provided between these two acoustic matching layers 120a (121a, 122), rear-surface backing material 140 provided as necessary on the thickness-direction (Z-direction) rear surface (at the bottom in FIG. 3A and FIG. 3B), on the opposite side of piezoelectric elements 110 from acoustic matching layers 120a (121a, 122), and propagating medium 130 provided on acoustic matching layers 120a (121a, 122) as necessary. The functions of these configuration elements (apart from grounding conductor 210) are the same as those described in the conventional technology shown in FIG. 1.

A ground electrode (not shown) is provided on the piezoelectric element 110 thickness-direction (Z-direction) front surface, and a signal electrode (not shown) on the rear surface. The two electrodes are formed on the front surface and rear surface respectively of piezoelectric elements 110 by means of gold or silver vapor deposition or sputtering, silver plating, or the like.

The configuration of ultrasonic probe 200 will now be described in greater detail.

Piezoelectric elements 110 are formed using a PZT or similar type of piezoelectric ceramic, a PZN-PT, PMN-PT, or similar type of piezoelectric monocrystal, or the like. First acoustic matching layer 121a, grounding conductor 210, and second acoustic matching layer 122 are provided on the side of a ground electrode (not shown) provided on each piezoelectric element 110 of such a material. Piezoelectric element 110 and first acoustic matching layer 121a are provided with a plurality of grooves 160 as first grooves of the present invention, running in the X direction. Grooves 160 are provided using a dicing machine or suchlike apparatus, for example. In this embodiment, these grooves 160 pierce both sides of piezoelectric element 110 and first acoustic matching layer 121a in the Z direction and completely divide piezoelectric element 110 and first acoustic matching layer 121a. Therefore, the direction in which grooves 160 are provided may be either from the surface of piezoelectric element 110 opposite the side on which first acoustic matching layer 121a is provided, or from the surface of first acoustic matching layer 121a opposite the side on which piezoelectric element 110 is provided. That is to say, this configuration is implemented just as well if the direction in which grooves 160 are provided is from the first acoustic matching layer 121a side rather than from the piezoelectric element 110 side, and therefore grooves 160 may be provided from either side.

In this embodiment, grooves 160 completely divide piezoelectric element 110 and first acoustic matching layer 121a, but the present invention is not limited to this. For example, grooves may be provided in first acoustic matching layer 121a so that a part is left, in the same way as in Embodiment 1. In this case, grooves 160 are provided from the piezoelectric element 110 side.

In this configuration, extension of an electrical terminal from a ground electrode of divided piezoelectric element 110 is performed using grounding conductor 210. Consequently, it is necessary for first acoustic matching layer 121a to be an electrical conductor. Therefore, graphite, or a material made a conductor by filling a high polymer with metallic powder (such as an electrically conductive adhesive), for example, may be used for first acoustic matching layer 121a. It is, of course, necessary for first acoustic matching layer 121a to have an acoustic impedance value between those of piezoelectric element 110 and a test subject (living organism).

Grooves 160 provided in piezoelectric element 110 and first acoustic matching layer 121a may be equally or randomly spaced. However, with regard to the material of piezoelectric element 110—for example, PZT piezoelectric ceramic—apart from a used thickness longitudinal oscillation mode, an unwanted latitudinal oscillation mode occurs, and this latitudinal oscillation mode has an adverse effect on a frequency characteristic and so forth. Therefore, it is necessary for the piezoelectric ceramic width to be made narrow—that is, for the intervals of grooves 160 to be made narrow—so that the latitudinal oscillation mode frequency is outside the used frequency range.

Also, by forming piezoelectric element 110 using a PZT piezoelectric ceramic, providing grooves 160 in this piezoelectric element 110, and filling these grooves 160 with a polymeric material such as epoxy resin or polyurethane resin, piezoelectric element 110 is given a function of a composite piezoelectric body combining a piezoelectric ceramic and a polymeric material. That is to say, by filling part of grooves 160 in piezoelectric element 110 with a polymeric material having small acoustic impedance, the acoustic impedance of piezoelectric element 110 can be made smaller than that of a piezoelectric ceramic, and can be made to approach the acoustic impedance of a test subject. By this means, implementation of a wide frequency band becomes possible. The acoustic impedance value of this composite piezoelectric body can be changed by changing the volumetric proportions of piezoelectric ceramic and polymeric material.

Meanwhile, with regard to the permittivity of a composite piezoelectric body, since the permittivity of a polymeric material is far smaller than the permittivity of a piezoelectric ceramic, if the volumetric proportion of piezoelectric ceramic is reduced, the permittivity of the composite piezoelectric body decreases, and its electrical impedance increases. As a result, a mismatch occurs with a connected ultrasonic diagnostic apparatus or cable, leading to a fall in sensitivity. Therefore, the volumetric proportion of piezoelectric ceramic used in a composite piezoelectric body is generally in a range of 50 to 75%.

As with piezoelectric element 110, first acoustic matching layer 121a is also provided with grooves 160, and these grooves 160 are filled with a polymeric material, so that first acoustic matching layer 121a becomes a composite body, and its acoustic impedance changes (falls) It is therefore necessary to take this fall into consideration when selecting the material of first acoustic matching layer 121a.

As described above, in this embodiment a configuration is employed in which an electrical terminal is extended from grounding conductor 210 via a ground electrode of piezoelectric element 110 and conductive first acoustic matching layer 121a, and therefore first acoustic matching layer 121a may be completely divided in the same way as piezoelectric element 110, or may be divided with a part left.

Grounding conductor 210 may be configured as a copper or suchlike metallic film element, or may be integrally configured with the provision of a polyimide or suchlike film on a metallic film for reinforcement, there being no problem as long as the configuration has flexibility. In the case of the latter configuration, it is of course necessary for provision to be made for the surface on the metallic conductor (metallic film) side of grounding conductor 210 to come into contact with first acoustic matching layer 121a. Grounding conductor 210 is electrically connected to a ground electrode (not shown) of piezoelectric element 110 and conductive first acoustic matching layer 121a, and has a function as an electrical terminal. In this embodiment, grounding conductor 210 is electrically connected to the ground electrodes (conductors) of all piezoelectric elements 110.

A configuration may also be used in which polyimide or suchlike film provided on a metallic film for reinforcement also serves as second acoustic matching layer 122.

When grooves 160 in divided piezoelectric element 110 and first acoustic matching layer 121a are filled with a polymeric material (for example, epoxy resin), signal conductor 150 is pressed against rear-surface backing material 140 formed into a curved surface shape, and is formed into a curved surface shape together with piezoelectric element 110, first acoustic matching layer 121a, grounding conductor 210, and second acoustic matching layer 122.

In this embodiment, as shown in FIG. 3A and FIG. 3B, a configuration is used in which rear-surface backing material 140, piezoelectric element 110, first acoustic matching layer 121a, grounding conductor 210, and second acoustic matching layer 122 are formed into a concave curved surface shape on the test subject side, so as to converge ultrasonic waves, but the curved surface shape is not limited to this. For example, a convex shape that diffuses ultrasonic waves may be used.

Since piezoelectric element 110 made of piezoelectric ceramic, and first acoustic matching layer 121a made of graphite or a material such as graphite filled with a metallic powder, intrinsically do not have flexibility allowing curving, forming them into a curved surface shape requires the preparation of items processed into a curved surface shape beforehand, and precision forming is difficult. Therefore, in this embodiment, a configuration allowing curving is achieved by providing grooves 160. Also, a polymeric film having flexibility allowing curving, such as epoxy resin or polyimide, may be used for second acoustic matching layer 122.

Signal conductor 150 is formed in the same way as in Embodiment 1. A metallic material such as copper may be used for signal conductor 150, with a thickness of around 10 microns ($\mu$m). If a copper or suchlike metallic conductive element lacks strength in terms of handling, a configuration may be used in which a polyimide film approximately 10 to 25 microns ($\mu$m) thick is provided. This kind of signal conductor 150 is amply flexible, and can therefore achieve close contact and electrical conductivity with a signal electrode of piezoelectric element 110 divided by the provision of grooves 160 even if curved. Also, using this kind of signal conductor 150 and above-described grounding conductor 210 means that, even if piezoelectric element 110 cracks, signal conductor 150 and grounding conductor 210 will not break due to their flexibility, and thus reliability (quality) is improved. Compared with a configuration in which an electrical terminal is connected to only part of an electrode of a piezoelectric element such as shown in Patent Document 1, this configuration enables a solution to be provided to such problems as an electrode being split and breaking through cracking of a piezoelectric element due to a mechanical impact from an external source.

The curvature of curved surface forming can be changed according to where the focal distance of ultrasonic waves is set. Also, a formed curved surface may have a single radius of curvature, or may have a plurality of radii of curvature such that the radius of curvature changes gradually in the Y direction in FIG. 3A and FIG. 3B.

Acoustic matching layers 120a (first acoustic matching layer 121a and second acoustic matching layer 122), grounding conductor 210, piezoelectric element 110, and signal conductor 150 are divided into a sequence of a plurality of piezoelectric elements by a plurality of dividing grooves 180 as second grooves of the present invention. That is to say, in this embodiment, after signal conductor 150, piezoelectric element 110, first acoustic matching layer 121a, grounding conductor 210, and second acoustic matching layer 122 have been pressed against rear-surface backing material 140 formed into a curved surface shape, and have been formed into a curved surface shape, second acoustic matching layer 122, grounding conductor 210, first acoustic matching layer 121a, piezoelectric element 110, signal conductor 150, and part of rear-surface backing material 140 are divided into a sequence of a plurality of piezoelectric elements by the above plurality of dividing grooves 180 in line with the signal conductor 150 pattern in the X direction (a direction orthogonal to the Y direction). This direction is the electronic scanning direction. The plurality of dividing grooves 180 are filled with a material such as silicone rubber with lower hardness than the epoxy resin or suchlike material filling grooves 160.

With regard to the material that fills grooves 160, since a plurality of piezoelectric bodies (individual parts of piezoelectric element 110 divided by grooves 160) arrayed in the Y direction are made to oscillate integrally, there is no problem if the oscillation of the individual Y-direction piezoelectric bodies leaks via the filling material such as epoxy resin filling grooves 160, and therefore the filling material of grooves 160 may be of a high degree of hardness. However, with regard to the sequence of a plurality of piezoelectric elements 110 divided in the X direction, when electrical signals are supplied to piezoelectric elements 110 via signal conductors 150 and grounding conductor 210, respective delays are applied to perform phase control of the electrical signals and deflect or converge the ultrasonic waves, and therefore it is necessary to keep leakage of ultrasonic wave oscillation between piezoelectric elements 110 small. Therefore, it is necessary for the filling material of dividing grooves 180 dividing signal conductor 150, piezoelectric element 110, first acoustic matching layer 121*a*, grounding conductor 210, and second acoustic matching layer 122 in the X direction to be a material of lower hardness, and less prone to transmission of oscillation, than the filling material of grooves 160 dividing piezoelectric element 110 in the Y direction.

Piezoelectric elements 110 (or to be more exact, the individual piezoelectric bodies) are columnar in shape through being divided in the X direction and Y direction in FIG. 3A and FIG. 3B, and the division intervals in both these directions should be approximately the same. As stated above, an unwanted latitudinal oscillation mode occurs in the piezoelectric ceramic of piezoelectric element 110, and if the piezoelectric ceramic width is made a width at which a latitudinal oscillation mode occurs in the used frequency band, an adverse effect (for example, narrowing of the frequency band) is produced on the used frequency characteristic, so that it is necessary to provide for the latitudinal oscillation mode to be outside the used frequency band. The same also applies to the X direction. Therefore, the effects of an unwanted latitudinal oscillation mode can be reduced by making the X-direction division intervals of piezoelectric element 110 approximately the same, in the same way as in the Y direction.

Lastly, propagating medium 130 is provided on second acoustic matching layer 122 as necessary. Polyurethane resin, butadiene rubber, silicone rubber, or the like, having an acoustic impedance value close to that of a living organism and a small ultrasonic wave attenuation coefficient, may be used for propagating medium 130. Also, since ultrasonic waves are refracted at the boundary if the sonic speed of propagating medium 130 differs from the sonic speed of a living organism, it is necessary to take this refraction into consideration as well as taking the curved surface shape of second acoustic matching layer 122 into consideration when setting the focal distance of ultrasonic waves.

Thus, according to this embodiment, a configuration is employed in which grooves 160 are provided and these are used to form piezoelectric element 110 and first acoustic matching layer 121*a* into a curved surface shape, enabling ultrasonic waves to be converged without an acoustic lens, and a configuration is employed in which signal conductor 150 is provided on a signal electrode surface of piezoelectric element 110, and grounding conductor 210 is provided on the surface of first acoustic matching layer 121*a* on the opposite side from piezoelectric element 110. Consequently, a configuration can be implemented that enables high sensitivity and wideband frequency characteristics to be obtained and high reliability to be achieved, making it possible to implement a high-quality, stable ultrasonic probe. Furthermore, an ultrasonic wave beam can be narrowly focused, and an ultrasonic wave beam can be deflected, enabling an ultrasonic probe to be implemented that provides a high-resolution ultrasonic image with high sensitivity.

In this embodiment, a case has been described in which piezoelectric elements 110 are arrayed linearly (in a planar configuration) in the X direction, but the shape of the X-direction array is not limited to this. For example, the same kind of effect can also be obtained if piezoelectric elements are arrayed in a convex or concave curved surface shape in the X direction.

In this embodiment, a case has been described in which a conductive material is used for first acoustic matching layer 121*a*, but the present invention is not limited to this. For example, the same kind of effect can also be obtained if the first acoustic matching layer is a composite body comprising an insulator and a conductor, the first acoustic matching layer is divided by first grooves (grooves 160) in the Y direction, and a conductor is provided on part of the first acoustic matching layer so that the divided parts become electrically conductive in the Z direction.

In this embodiment, a case has been described in which piezoelectric element 110 and acoustic matching layers 120*a* are formed into a concave curved surface shape in the Y direction on the test subject side, but the curved surface shape is not limited to this. For example, the same kind of effect can also be obtained if the piezoelectric element and acoustic matching layers are made convex in the Y direction on the test subject side, and also if a curved surface having a single radius of curvature or a curved surface having a plurality of radii of curvature such that the radius of curvature changes gradually is used, irrespective of concavity or convexity.

In this embodiment, a case has been described in which grounding conductor 210 is provided on conductive first acoustic matching layer 121*a*, but the present invention is not limited to this. For example, when the first and second acoustic matching layers are conductors, the same kind of effect can also be obtained if a grounding conductor is provided on the second acoustic matching layer.

Embodiment 3

Embodiment 3 is a case in which three acoustic matching layers are provided instead of two acoustic matching layers 120*a* according to Embodiment 2.

Figure 4A:
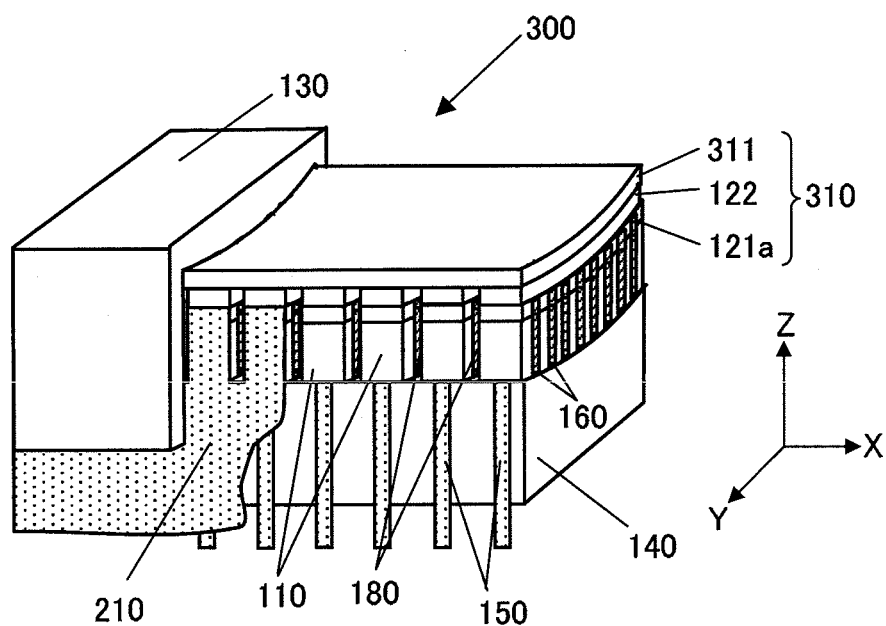
FIG. 4A is a partial schematic perspective view of an ultrasonic probe according to Embodiment 3 of the present invention.
Figure 4B:
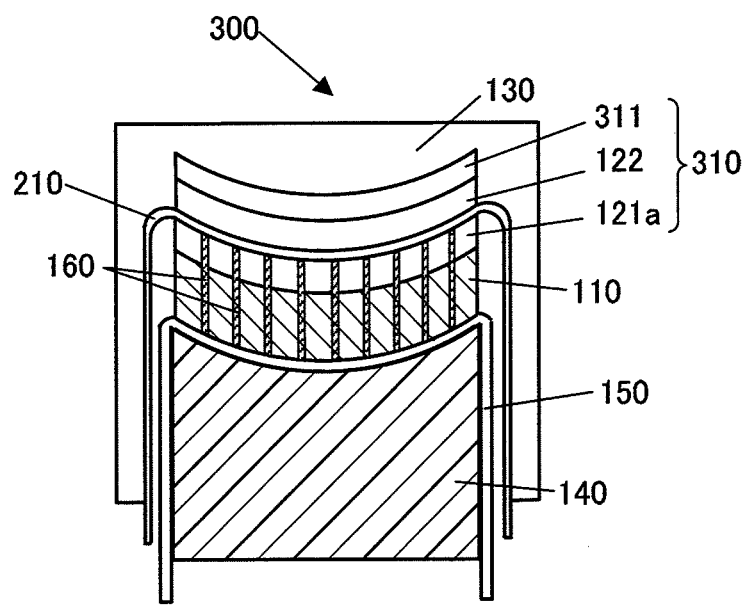
FIG. 4B is a schematic cross-sectional diagram of the ultrasonic probe shown in FIG. 4A viewed from the X direction.

FIG. 4A is a partial schematic perspective view of an ultrasonic probe according to Embodiment 3 of the present invention, and FIG. 4B is a schematic cross-sectional diagram of the ultrasonic probe shown in FIG. 4A viewed from the X direction. This ultrasonic probe has a similar basic configuration to an ultrasonic probe according to Embodiment 2 shown in FIG. 3A and FIG. 3B, and identical configuration elements are assigned the same reference codes.

Ultrasonic probe 300 shown in FIG. 4A and FIG. 4B is composed of a plurality of piezoelectric elements 110 arrayed in one direction (the X direction), three acoustic matching layers 310 (121*a*, 122, 311) provided on the thickness-direction (Z-direction) front surface on the test subject side (at the top in FIG. 4A and FIG. 4B) of each piezoelectric element 110, grounding conductor 210 provided between these three acoustic matching layers 310 (121*a*, 122, 311), rear-surface backing material 140 provided as necessary on the thickness-direction (Z-direction) rear surface (at the bottom in FIG. 4A and FIG. 4B), on the opposite side of piezoelectric elements 110 from acoustic matching layers 310 (121*a*, 122, 311), and propagating medium 130 provided on acoustic matching layers 310 (121a, 122, 311) as necessary. Here, grounding conductor 210 is provided between first acoustic matching layer 121a and second acoustic matching layer 122. The functions of these configuration elements (apart from grounding conductor 210) are the same as those described in the conventional technology shown in FIG. 1.

A ground electrode (not shown) is provided on the piezoelectric element 110 thickness-direction (Z-direction) front surface, and a signal electrode (not shown) on the rear surface. The two electrodes are formed on the front surface and rear surface respectively of piezoelectric elements 110 by means of gold or silver vapor deposition or sputtering, silver plating, or the like.

The configuration of ultrasonic probe 300 will now be described in greater detail.

Piezoelectric elements 110 are formed using a PZT or similar type of piezoelectric ceramic, a PZN-PT, PMN-PT, or similar type of piezoelectric monocrystal, or the like. First acoustic matching layer 121a, grounding conductor 210, second acoustic matching layer 122, and third acoustic matching layer 311 are provided on the side of a ground electrode (not shown) provided on each piezoelectric element 110 of such a material. Piezoelectric element 110 and first acoustic matching layer 121a are provided with a plurality of grooves 160 as first grooves of the present invention, running in the X direction. Grooves 160 are provided using a dicing machine or suchlike apparatus, for example. In this embodiment, these grooves 160 pierce both sides of piezoelectric element 110 and first acoustic matching layer 121a in the Z direction and completely divide piezoelectric element 110 and first acoustic matching layer 121a. Therefore, the direction in which grooves 160 are provided may be either from the surface of piezoelectric element 110 opposite the side on which first acoustic matching layer 121a is provided, or from the surface of first acoustic matching layer 121a opposite the side on which piezoelectric element 110 is provided. That is to say, this configuration is implemented just as well if the direction in which grooves 160 are provided is from the first acoustic matching layer 121a side rather than from the piezoelectric element 110 side, and therefore grooves 160 may be provided from either side.

In this embodiment, grooves 160 completely divide piezoelectric element 110 and first acoustic matching layer 121a, but the present invention is not limited to this. For example, grooves may be provided in first acoustic matching layer 121a so that a part is left, in the same way as in Embodiment 1. In this case, grooves 160 are provided from the piezoelectric element 110 side.

In this configuration, extension of an electrical terminal from a ground electrode of divided piezoelectric element 110 is performed using grounding conductor 210. Consequently, it is necessary for first acoustic matching layer 121a to be an electrical conductor. Therefore, graphite, or a material made a conductor by filling a high polymer with metallic powder (such as an electrically conductive adhesive), for example, may be used for first acoustic matching layer 121a. It is, of course, necessary for first acoustic matching layer 121a to have an acoustic impedance value between those of piezoelectric element 110 and a test subject (living organism).

Grooves 160 provided in piezoelectric element 110 and first acoustic matching layer 121a may be equally or randomly spaced. However, with regard to the material of piezoelectric element 110—for example, PZT piezoelectric ceramic—apart from a used thickness longitudinal oscillation mode, an unwanted latitudinal oscillation mode occurs, and this latitudinal oscillation mode has an adverse effect on a frequency characteristic and so forth. Therefore, it is necessary for the piezoelectric ceramic width to be made narrow—that is, for the intervals of grooves 160 to be made narrow—so that the latitudinal oscillation mode frequency is outside the used frequency range.

Also, by forming piezoelectric element 110 using a PZT piezoelectric ceramic, providing grooves 160 in this piezoelectric element 110, and filling these grooves 160 with a polymeric material such as epoxy resin or polyurethane resin, piezoelectric element 110 is given a function of a composite piezoelectric body combining a piezoelectric ceramic and a polymeric material. That is to say, by filling part of grooves 160 in piezoelectric element 110 with a polymeric material having small acoustic impedance, the acoustic impedance of piezoelectric element 110 can be made smaller than that of a piezoelectric ceramic, and can be made to approach the acoustic impedance of a test subject. By this means, implementation of a wide frequency band becomes possible. The acoustic impedance value of this composite piezoelectric body can be changed by changing the volumetric proportions of piezoelectric ceramic and polymeric material.

Meanwhile, with regard to the permittivity of a composite piezoelectric body, since the permittivity of a polymeric material is far smaller than the permittivity of a piezoelectric ceramic, if the volumetric proportion of piezoelectric ceramic is reduced, the permittivity of the composite piezoelectric body decreases, and its electrical impedance increases. As a result, a mismatch occurs with a connected ultrasonic diagnostic apparatus or cable, leading to a fall in sensitivity. Therefore, the volumetric proportion of piezoelectric ceramic used in a composite piezoelectric body is generally in a range of 50 to 75%.

As with piezoelectric element 110, first acoustic matching layer 121a is also provided with grooves 160, and these grooves 160 are filled with a polymeric material, so that first acoustic matching layer 121a becomes a composite body, and its acoustic impedance changes (falls) It is therefore necessary to take this fall into consideration when selecting the material of first acoustic matching layer 121a.

As described above, in this embodiment a configuration is employed in which an electrical terminal is extended from grounding conductor 210 via a ground electrode of piezoelectric element 110 and conductive first acoustic matching layer 121a, and therefore first acoustic matching layer 121a may be completely divided in the same way as piezoelectric element 110, or may be divided with a part left.

Grounding conductor 210 may be configured as a copper or suchlike metallic film element, or may be integrally configured with the provision of a polyimide or such like film on a metallic film for reinforcement, there being no problem as long as the configuration has flexibility. In the case of the latter configuration, it is of course necessary for provision to be made for the surface on the metallic conductor (metallic film) side of grounding conductor 210 to come into contact with first acoustic matching layer 121a. Grounding conductor 210 is electrically connected to a ground electrode (not shown) of piezoelectric element 110 and conductive first acoustic matching layer 121a, and has a function as an electrical terminal. In this embodiment, grounding conductor 210 is electrically connected to the ground electrodes (conductors) of all piezoelectric elements 110.

A configuration may also be used in which polyimide or suchlike film provided on a metallic film for reinforcement also serves as second acoustic matching layer 122.

When grooves 160 in divided piezoelectric element 110 and first acoustic matching layer 121a are filled with a polymeric material (for example, epoxy resin), signal conductor 150 is pressed against rear-surface backing material 140 formed into a curved surface shape, and is formed into a curved surface shape together with piezoelectric element 110, first acoustic matching layer 121a, grounding conductor 210, second acoustic matching layer 122, and third acoustic matching layer 311.

In this embodiment, as shown in FIG. 4A and FIG. 4B, a configuration is used in which rear-surface backing material 140, piezoelectric element 110, first acoustic matching layer 121a, grounding conductor 210, second acoustic matching layer 122, and third acoustic matching layer 311 are formed into a concave curved surface shape on the test subject side, so as to converge ultrasonic waves, but the curved surface shape is not limited to this. For example, a convex shape that diffuses ultrasonic waves may be used.

Since piezoelectric element 110 made of piezoelectric ceramic, and first acoustic matching layer 121a made of graphite or a material such as graphite filled with a metallic powder, intrinsically do not have flexibility allowing curving, forming them into a curved surface shape requires the preparation of items processed into a curved surface shape beforehand, and precision forming is difficult. Therefore, in this embodiment, a configuration allowing curving is achieved by providing grooves 160. Also, a polymeric film having flexibility allowing curving, such as epoxy resin filled with a metal, oxide, or suchlike powder, may be used for second acoustic matching layer 122.

Signal conductor 150 is formed in the same way as in Embodiment 1. A metallic material such as copper may be used for signal conductor 150, with a thickness of around 10 microns (μm). If a copper or suchlike metallic conductive element lacks strength in terms of handling, a configuration may be used in which a polyimide film approximately 10 to 25 microns (μm) thick is provided. This kind of signal conductor 150 is amply flexible, and can therefore achieve close contact and electrical conductivity with a signal electrode of piezoelectric element 110 divided by the provision of grooves 160 even if curved. Also, using this kind of signal conductor 150 and above-described grounding conductor 210 means that, even if piezoelectric element 110 cracks, signal conductor 150 and grounding conductor 210 will not break due to their flexibility, and thus reliability (quality) is improved. Compared with a configuration in which an electrical terminal is connected to only part of an electrode of a piezoelectric element such as shown in Patent Document 1, this configuration enables a solution to be provided to such problems as an electrode being split and breaking through cracking of a piezoelectric element due to a mechanical impact from an external source.

The curvature of curved surface forming can be changed according to where the focal distance of ultrasonic waves is set. Also, a formed curved surface may have a single radius of curvature, or may have a plurality of radii of curvature such that the radius of curvature changes gradually in the Y direction in FIG. 4A and FIG. 4B.

Second acoustic matching layer 122, first acoustic matching layer 121a, grounding conductor 210, piezoelectric element 110, and signal conductor 150 are divided into a sequence of a plurality of piezoelectric elements by a plurality of dividing grooves 180 as second grooves of the present invention. That is to say, in this embodiment, after signal conductor 150, piezoelectric element 110, first acoustic matching layer 121a, grounding conductor 210, and second acoustic matching layer 122 have been pressed against rear-surface backing material 140 formed into a curved surface shape, and have been formed into a curved surface shape, second acoustic matching layer 122, grounding conductor 210, first acoustic matching layer 121a, piezoelectric element 110, signal conductor 150, and part of rear-surface backing material 140 are divided into a sequence of a plurality of piezoelectric elements by the above plurality of dividing grooves 180 in line with the signal conductor 150 pattern in the X direction (a direction orthogonal to the Y direction). This direction is the electronic scanning direction. The plurality of dividing grooves 180 are filled with a material such as silicone rubber with lower hardness than the epoxy resin or suchlike material filling grooves 160.

With regard to the material that fills grooves 160, since a plurality of piezoelectric bodies (individual parts of piezoelectric element 110 divided by grooves 160) arrayed in the Y direction are made to oscillate integrally, there is no problem if the oscillation of the individual Y-direction piezoelectric bodies leaks via the filling material such as epoxy resin filling grooves 160, and therefore the filling material of grooves 160 may be of a high degree of hardness. However, with regard to the sequence of a plurality of piezoelectric elements 110 divided in the X direction, when electrical signals are supplied to piezoelectric elements 110 via signal conductors 150 and grounding conductor 210, respective delays are applied to perform phase control of the electrical signals and deflect or converge the ultrasonic waves, and therefore it is necessary to keep leakage of ultrasonic wave oscillation between piezoelectric elements 110 small. Therefore, it is necessary for the filling material of dividing grooves 180 dividing signal conductor 150, piezoelectric element 110, first acoustic matching layer 121a, grounding conductor 210, and second acoustic matching layer 122 in the X direction to be a material of lower hardness, and less prone to transmission of oscillation, than the filling material of grooves 160 dividing piezoelectric element 110 in the Y direction.

Piezoelectric elements 110 (or to be more exact, the individual piezoelectric bodies) are columnar in shape through being divided in the X direction and Y direction in FIG. 4A and FIG. 4B, and the division intervals in both these directions should be approximately the same. As stated above, an unwanted latitudinal oscillation mode occurs in the piezoelectric ceramic of piezoelectric element 110, and if the piezoelectric ceramic width is made a width at which a latitudinal oscillation mode occurs in the used frequency band, an adverse effect (for example, narrowing of the frequency band) is produced on the used frequency characteristic, so that it is necessary to provide for the latitudinal oscillation mode to be outside the used frequency band. The same also applies to the X direction. Therefore, the effects of an unwanted latitudinal oscillation mode can be reduced by making the X-direction division intervals of piezoelectric element 110 approximately the same, in the same way as in the Y direction.

In this embodiment, third acoustic matching layer 311 is provided on second acoustic matching layer 122. As shown in FIG. 4A and FIG. 4B, third acoustic matching layer 311 is provided as a single surface, not divided in any direction, on second acoustic matching layer 122 divided in the X direction.

However, to prevent leakage of ultrasonic wave oscillation into adjacent piezoelectric elements 110 through separate oscillation of individual piezoelectric elements 110 in the X direction, it is preferable for third acoustic matching layer 311 also to be divided in the same way as first acoustic matching layer 121a and second acoustic matching layer 122. A method of assessing whether a single piezoelectric element 110 is separately performing ultrasonic wave oscillation and radiating ultrasonic waves on the test subject side is to measure the degree of directivity with which ultrasonic waves are radiated on the test subject side from piezoelectric element 110 via acoustic matching layers 121a, 122, and 311 in the X direction. The wider the directivity, the less lateral ultrasonic wave leakage there is, and piezoelectric elements 110 tend to oscillate separately, which is good, whereas, conversely, narrow directivity does not have a particularly good result.

Generally, with a so-called electronic-scanning ultrasonic probe in which a plurality of piezoelectric elements 110 are arrayed in one direction (the X direction), how wide X-direction directivity of arrayed piezoelectric elements 110 can be made is an important point in improving the resolution of an ultrasonic image. Also, as with piezoelectric elements 110, keeping the number of divided acoustic matching layers small enables stable processing to be performed even if the division interval is narrow (for example, 0.1 mm), and makes it possible to create an ultrasonic probe of uniformly good precision. Furthermore, it is also possible to use a configuration in which directivity is not made narrow.

For example, when the X-direction directional angle when piezoelectric element 110 with a 3.5 MHz center frequency is divided at piezoelectric element 110 X-direction intervals of 0.38 mm (two divided at 0.19 mm intervals being electrically bound) is defined at a −6 dB level, in the case of a configuration in which third acoustic matching layer 311 is divided in the same way as piezoelectric element 110, the angle of beam spread is approximately 23 degrees. Dividing grooves 180 dividing piezoelectric element 110, first acoustic matching layer 121a, and second acoustic matching layer 122 are filled with a silicone rubber material.

Meanwhile, directional characteristics were measured for ultrasonic waves in the piezoelectric element 110 array direction (X direction) in the case of a configuration in which above piezoelectric element 110 is divided in the same kind of way as described above, and of three acoustic matching layers 310, first and second acoustic matching layers 121a and 122 on the piezoelectric element 110 side are divided in the same way as piezoelectric element 110, while third acoustic matching layer 311 located on the test subject side is not divided at all. At this time, silicone rubber (with a Shore-A hardness of 76, sonic speed of 915 m/sec, and acoustic impedance of 2.1 megarayls), chloroprene rubber (with a Shore-A hardness of 70, sonic speed of 1630 m/sec, and acoustic impedance of 2.16 megarayls), ethylene-propylene copolymer rubber (with a Shore-A hardness of 65, sonic speed of 1480 m/sec, and acoustic impedance of 1.94 megarayls), acrylonitrile-butadiene copolymer rubber (with a Shore-A hardness of 60, sonic speed of 1640 m/sec, and acoustic impedance of 1.97 megarayls), and polyurethane rubber (with a Shore-A hardness of 78, sonic speed of 1850 m/sec, and acoustic impedance of 1.98 megarayls), were used as the material of third acoustic matching layer 311 located on the test subject side. The results showed a difference in directional characteristics according to the material of third acoustic matching layer 311. Dividing grooves 180 dividing piezoelectric element 110, first acoustic matching layer 121a, and second acoustic matching layer 122 (the width of dividing grooves 180 being approximately 0.03 mm at this time) were filled with a silicone rubber material in the same way as in a configuration in which division is performed up to second acoustic matching layer 122. Materials other than polyurethane rubber among the above-listed materials had an arbitrary amount of filler, such as alumina, carbon, or calcium carbonate, added to adjust the acoustic impedance.

Figure 5:
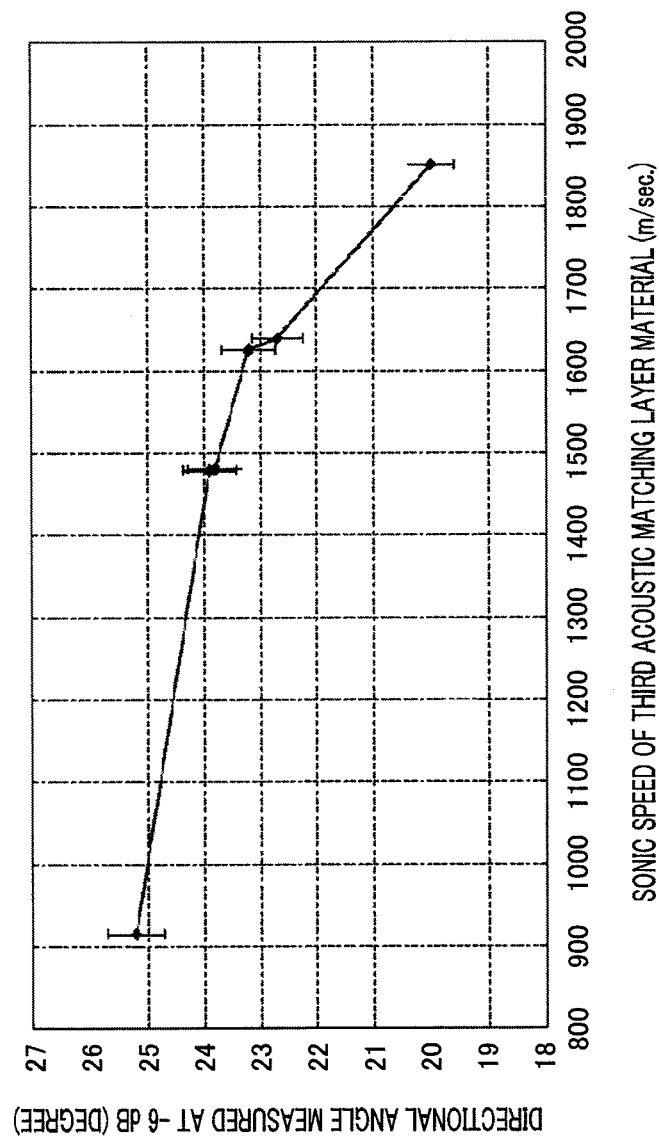
FIG. 5 is a graph showing the relationship between the sonic speed and directional angle of a third acoustic matching layer material according to Embodiment 3.

The above-mentioned differences in directional characteristics had no correlation to the hardness, acoustic impedance, etc., of a material, and these items did not have much effect on directional characteristics. An item that affected—that is, had correlation to—directional characteristics was the sonic speed characteristic of the third acoustic matching layer 311 material, and this showed good correlation to directional characteristics. Results of the relationship between the directional angle measured at a −6 dB level at a frequency of 3.5 MHz and the sonic speed of the material of third acoustic matching layer 311 are shown in FIG. 5. As shown in FIG. 5, the directional angle shows a good correlation to sonic speed, the coefficient of correlation being 0.86. From this it can be seen that, in a configuration in which third acoustic matching layer 311 located on the test subject side is not divided, it is necessary to consider the sonic speed of the material of third acoustic matching layer 311.

For example, the directional angle results for the third acoustic matching layer 311 materials used in the above example were as follows: 25 degrees when silicone rubber was used, 23.5 degrees when chloroprene rubber was used, 23.5 degrees when ethylene-propylene copolymer rubber was used, 22.9 degrees when acrylonitrile-butadiene copolymer rubber was used, and 20 degrees when polyurethane rubber was used. The variance of these measurement results is thought to be approximately ±0.5 degrees.

This suggests that, in order for directional characteristics equivalent to or exceeding those of a configuration in which all laminated acoustic matching layers are divided in the same way as piezoelectric element 110 to be obtained with a configuration in which all laminated acoustic matching layers are not divided in the same way as piezoelectric element 110, the sonic speed of the acoustic matching layers should be limited, and a rubber elastic solid having a sonic speed value of 1650 m/sec or below should be used. Of course, since third acoustic matching layer 311 is a rubber elastic solid and has ample flexibility, it is possible to form third acoustic matching layer 311 on the curved surface of second acoustic matching layer 122, following its curved surface shape.

Lastly, propagating medium 130 is provided on third acoustic matching layer 311 as necessary. Polyurethane resin, butadiene rubber, silicone rubber, or the like, having an acoustic impedance value close to that of a living organism and a small ultrasonic wave attenuation coefficient, may be used for propagating medium 130. Also, since ultrasonic waves are refracted at the boundary if the sonic speed of propagating medium 130 differs from the sonic speed of a living organism, it is necessary to take this refraction into consideration as well as taking the curved surface shape of second acoustic matching layer 122 into consideration when setting the focal distance of ultrasonic waves.

Thus, according to this embodiment, a configuration is employed in which grooves 160 are provided and these are used to form piezoelectric element 110 and first acoustic matching layer 121a into a curved surface shape, enabling ultrasonic waves to be converged without an acoustic lens, and a configuration is employed in which signal conductor 150 is provided on a signal electrode surface of piezoelectric element 110, grounding conductor 210 is provided on the surface of first acoustic matching layer 121a on the opposite side from piezoelectric element 110, and three acoustic matching layers 310 are provided. Consequently, a configuration can be implemented that enables high sensitivity and wideband frequency characteristics to be obtained and high reliability to be achieved, making it possible to implement a high-quality, stable ultrasonic probe. Furthermore, an ultrasonic wave beam can be narrowly focused, and an ultrasonic wave beam can be deflected, enabling an ultrasonic probe to be implemented that provides a high-resolution ultrasonic image with high sensitivity.

In this embodiment, a case has been described in which piezoelectric elements 110 are arrayed linearly (in a planar configuration) in the X direction, but the shape of the X-direction array is not limited to this. For example, the same kind of effect can also be obtained if piezoelectric elements are arrayed in a convex or concave curved surface shape in the X direction.

In this embodiment, a case has been described in which a conductive material is used for first acoustic matching layer 121a, but the present invention is not limited to this. For example, the same kind of effect can also be obtained if the first acoustic matching layer is a composite body comprising an insulator and a conductor, the first acoustic matching layer is divided by first grooves (grooves 160) in the Y direction, and a conductor is provided on part of the first acoustic matching layer so that the divided parts become electrically conductive in the Z direction.

In this embodiment, a case has been described in which piezoelectric element 110 and acoustic matching layers 310 are formed into a concave curved surface shape in the Y direction on the test subject side, but the curved surface shape is not limited to this. For example, the same kind of effect can also be obtained if the piezoelectric element and acoustic matching layers are made convex in the Y direction on the test subject side, and also if a curved surface having a single radius of curvature or a curved surface having a plurality of radii of curvature such that the radius of curvature changes gradually is used, irrespective of concavity or convexity.

In this embodiment, a case has been described in which grounding conductor 210 is provided on conductive first acoustic matching layer 121a, but the present invention is not limited to this. For example, when the first and second acoustic matching layers are conductors, the same kind of effect can also be obtained if a grounding conductor is provided on the second acoustic matching layer, and the third acoustic matching layer is provided on the upper surface thereof.

Embodiment 4

Embodiment 4 is a case in which the thickness of a piezoelectric element and first acoustic matching layer according to Embodiment 2 is varied.

Figure 6A:
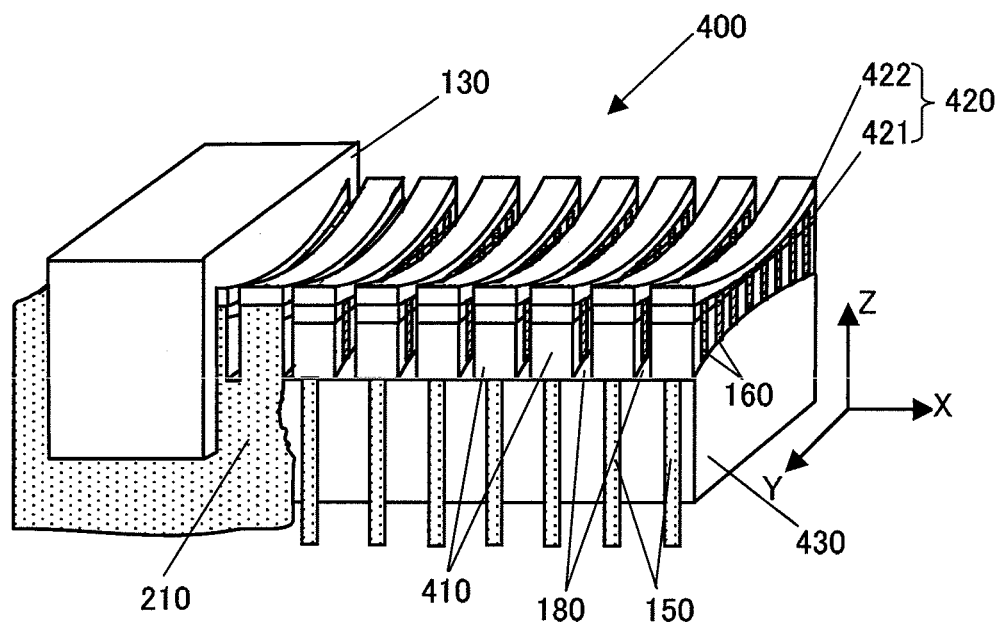
FIG. 6A is a partial schematic perspective view of an ultrasonic probe according to Embodiment 4 of the present invention.
Figure 6B:
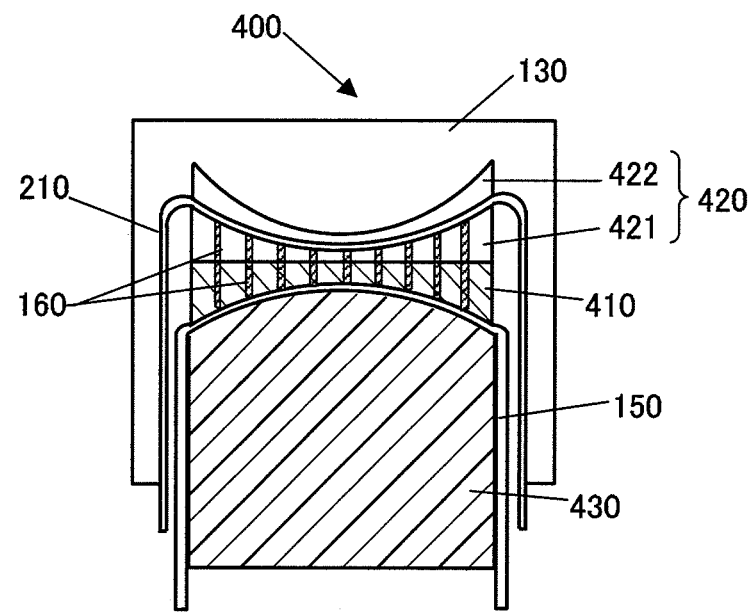
FIG. 6B is a schematic cross-sectional diagram of the ultrasonic probe shown in FIG. 6A viewed from the X direction.

FIG. 6A is a partial schematic perspective view of an ultrasonic probe according to Embodiment 4 of the present invention, and FIG. 6B is a schematic cross-sectional diagram of the ultrasonic probe shown in FIG. 6A viewed from the X direction. This ultrasonic probe has a similar basic configuration to an ultrasonic probe according to Embodiment 2 shown in FIG. 3A and FIG. 3B, and identical configuration elements are assigned the same reference codes.

Ultrasonic probe 400 shown in FIG. 6A and FIG. 6B is composed of a plurality of piezoelectric elements 410 arrayed in one direction (the X direction), two acoustic matching layers 420 (421, 422) provided on the thickness-direction (Z-direction) front surface on the test subject side (at the top in FIG. 6A and FIG. 6B) of each piezoelectric element 410, grounding conductor 210 provided between these two acoustic matching layers 420 (421, 422), rear-surface backing material 430 provided as necessary on the thickness-direction (Z-direction) rear surface (at the bottom in FIG. 6A and FIG. 6B), on the opposite side of piezoelectric elements 410 from acoustic matching layers 420 (421, 422), and propagating medium 130 provided on acoustic matching layers 420 (421, 422) as necessary. The functions of these configuration elements (apart from grounding conductor 210) are the same as those described in the conventional technology shown in FIG. 1.

A ground electrode (not shown) is provided on the piezoelectric element 410 thickness-direction (Z-direction) front surface, and a signal electrode (not shown) on the rear surface. The two electrodes are formed on the front surface and rear surface respectively of piezoelectric elements 410 by means of gold or silver vapor deposition or sputtering, silver plating, or the like.

The configuration of ultrasonic probe 400 will now be described in greater detail.

In this embodiment, piezoelectric elements 410 are formed with their thickness varied in the Y direction using a PZT or similar type of piezoelectric ceramic, a PZN-PT, PMN-PT, or similar type of piezoelectric monocrystal, or the like. First acoustic matching layer 421, grounding conductor 210, and second acoustic matching layer 422 are provided on the side of a ground electrode (not shown) provided on each piezoelectric element 410 with its thickness varied in the Y direction using such a material. The thickness of first acoustic matching layer 421 and second acoustic matching layer 422 varies in the Y direction in the same way as that of piezoelectric element 410.

Piezoelectric element 410 and first acoustic matching layer 421 are provided with a plurality of grooves 160 as first grooves of the present invention, running in the X direction. Grooves 160 are provided using a dicing machine or suchlike apparatus, for example. In this embodiment, these grooves 160 pierce both sides of piezoelectric element 410 and first acoustic matching layer 421 in the Z direction and completely divide piezoelectric element 410 and first acoustic matching layer 421. Therefore, the direction in which grooves 160 are provided may be either from the surface of piezoelectric element 410 opposite the side on which first acoustic matching layer 421 is provided, or from the surface of first acoustic matching layer 421 opposite the side on which piezoelectric element 410 is provided. That is to say, this configuration is implemented just as well if the direction in which grooves 160 are provided is from the first acoustic matching layer 421 side rather than from the piezoelectric element 410 side, and therefore grooves 160 may be provided from either side.

In this embodiment, grooves 160 completely divide piezoelectric element 410 and first acoustic matching layer 421, but the present invention is not limited to this. For example, grooves may be provided in first acoustic matching layer 421 so that a part is left, in the same way as in Embodiment 1. In this case, grooves 160 are provided from the piezoelectric element 410 side.

In this configuration, extension of an electrical terminal from a ground electrode of divided piezoelectric element 410 is performed using grounding conductor 210. Consequently, it is necessary for first acoustic matching layer 421 to be an electrical conductor. Therefore, graphite, or a material made a conductor by filling a high polymer with metallic powder (such as an electrically conductive adhesive), for example, may be used for first acoustic matching layer 421. It is, of course, necessary for first acoustic matching layer 421 to have an acoustic impedance value between those of piezoelectric element 410 and a test subject (living organism).

The thickness of piezoelectric element 410 in one direction (the Y direction) orthogonal to the piezoelectric element 410 array direction (X direction) is nonuniform, with thickness decreasing in the center area and increasing toward the ends in the Y direction. Specifically, as shown in FIG. 6A and FIG. 6B, piezoelectric element 410 has a planar front surface on the test subject side and a curved rear surface on the rear-surface backing material 430 side. By making the thickness of piezoelectric element 410 nonuniform, the focal depth of an ultrasonic wave beam can be increased, and a wideband frequency characteristic can be obtained, improving resolution. A configuration in which the piezoelectric element thickness is made nonuniform in the Y direction in this way is already known, as disclosed in Japanese Patent Application Laid-Open No. HEI 7-107595, for example. That is to say, since thickness decreases in the center area of piezoelectric element 410 in the Y direction, this area transmits and receives high-frequency component ultrasonic waves, and since thickness increases toward the ends, these areas transmit and receive low-frequency component ultrasonic waves. Meanwhile, the thickness of acoustic matching layers 420 (421, 422) is also varied in line with variation of a frequency corresponding to the thickness of piezoelectric element 410, with the basic thickness being ¼ wavelength. Therefore, as shown in FIG. 6A and FIG. 6B, acoustic matching layers 420 (421, 422) have a concave shape on the test subject side since thickness is minimal in the center area and increases toward the ends.

The fact that acoustic matching layers 420 (421, 422) have a concave shape in this way means, naturally, that ultrasonic waves converge at a certain distance toward the test subject side based on the radius of curvature of the concave shape. However, the distance at which ultrasonic waves converge is not necessarily the target distance, and there is a problem of convergence at a point nearer or farther than the target distance. A feature of this embodiment is the provision of a configuration that solves this problem.

Grooves 160 provided in piezoelectric element 410 and first acoustic matching layer 421 may be equally or randomly spaced. However, with regard to the material of piezoelectric element 410—for example, PZT piezoelectric ceramic—apart from a used thickness longitudinal oscillation mode, an unwanted latitudinal oscillation mode occurs, and this latitudinal oscillation mode has an adverse effect on a frequency characteristic and so forth. Therefore, it is necessary for the piezoelectric ceramic width to be made narrow—that is, for the intervals of grooves 160 to be made narrow—so that the latitudinal oscillation mode frequency is outside the used frequency range.

Also, by forming piezoelectric element 410 using a PZT piezoelectric ceramic, providing grooves 160 in this piezoelectric element 410, and filling these grooves 160 with a polymeric material such as epoxy resin or polyurethane resin, piezoelectric element 410 is given a function of a composite piezoelectric body combining a piezoelectric ceramic and a polymeric material. That is to say, by filling part of grooves 160 in piezoelectric element 410 with a polymeric material having small acoustic impedance, the acoustic impedance of piezoelectric element 410 can be made smaller than that of a piezoelectric ceramic, and can be made to approach the acoustic impedance of a test subject. By this means, implementation of a wide frequency band becomes possible. The acoustic impedance value of this composite piezoelectric body can be changed by changing the volumetric proportions of piezoelectric ceramic and polymeric material.

Meanwhile, with regard to the permittivity of a composite piezoelectric body, since the permittivity of a polymeric material is far smaller than the permittivity of a piezoelectric ceramic, if the volumetric proportion of piezoelectric ceramic is reduced, the permittivity of the composite piezoelectric body decreases, and its electrical impedance increases. As a result, a mismatch occurs with a connected ultrasonic diagnostic apparatus or cable, leading to a fall in sensitivity. Therefore, the volumetric proportion of piezoelectric ceramic used in a composite piezoelectric body is generally in a range of 50 to 75%.

As with piezoelectric element 410, first acoustic matching layer 421 is also provided with grooves 160, and these grooves 160 are filled with a polymeric material, so that first acoustic matching layer 421 becomes a composite body, and its acoustic impedance changes (falls). It is therefore necessary to take this fall into consideration when selecting the material of first acoustic matching layer 421.

As described above, in this embodiment a configuration is employed in which an electrical terminal is extended from grounding conductor 210 via a ground electrode of piezoelectric element 410 and conductive first acoustic matching layer 421, and therefore first acoustic matching layer 421 may be completely divided in the same way as piezoelectric element 410, or may be divided with a part left.

Grounding conductor 210 may be configured as a copper or suchlike metallic film element, or may be integrally configured with the provision of a polyimide or suchlike film on a metallic film for reinforcement, there being no problem as long as the configuration has flexibility. In the case of the latter configuration, it is of course necessary for provision to be made for the surface on the metallic conductor (metallic film) side of grounding conductor 210 to come into contact with first acoustic matching layer 421. Grounding conductor 210 is electrically connected to a ground electrode (not shown) of piezoelectric element 410 and conductive first acoustic matching layer 421, and has a function as an electrical terminal. In this embodiment, grounding conductor 210 is electrically connected to the ground electrodes (conductors) of all piezoelectric elements 410.

A configuration may also be used in which polyimide or suchlike film provided on a metallic film for reinforcement also serves as second acoustic matching layer 422.

When grooves 160 in divided piezoelectric element 410 and first acoustic matching layer 421 are filled with a polymeric material (for example, epoxy resin), signal conductor 150 is pressed against rear-surface backing material 430 formed into a curved surface shape, and is formed into a curved surface shape together with piezoelectric element 410, first acoustic matching layer 421, grounding conductor 210, and second acoustic matching layer 422.

Since piezoelectric element 410 made of piezoelectric ceramic, and first acoustic matching layer 421 made of graphite or a material such as graphite filled with a metallic powder, intrinsically do not have flexibility allowing curving, forming them into a curved surface shape requires the preparation of items processed into a curved surface shape beforehand, and precision forming is difficult. Therefore, a configuration allowing curving is achieved by providing grooves 160. Also, a polymeric film having flexibility allowing curving, such as epoxy resin or polyimide, may be used for second acoustic matching layer 422.

Signal conductor 150 is formed in the same way as in Embodiment 1. A metallic material such as copper may be used for signal conductor 150, with a thickness of around 10 microns (μm). If a copper or suchlike metallic conductive element lacks strength in terms of handling, a configuration may be used in which a polyimide film approximately 10 to 25 microns (μm) thick is provided. This kind of signal conductor 150 is amply flexible, and can therefore achieve close contact and electrical conductivity with a signal electrode of piezoelectric element 410 divided by the provision of grooves 160 even if curved. Also, using this kind of signal conductor 150 and above-described grounding conductor 210 means that, even if piezoelectric element 410 cracks, signal conductor 150 and grounding conductor 210 will not break due to their flexibility, and thus reliability (quality) is improved. Compared with a configuration in which an electrical terminal is connected to only part of an electrode of a piezoelectric element such as shown in Patent Document 1, this configuration enables a solution to be provided to such problems as an electrode being split and breaking through cracking of a piezoelectric element due to a mechanical impact from an external source.

The curvature of curved surface forming can be changed according to where the focal distance of ultrasonic waves is set. Also, a formed curved surface may have a single radius of curvature, or may have a plurality of radii of curvature such that the radius of curvature changes gradually in the Y direction in FIG. 6A and FIG. 6B.

Acoustic matching layers 420 (first acoustic matching layer 421 and second acoustic matching layer 422) grounding conductor 210, piezoelectric element 410, and signal conductor 150 are divided into a sequence of a plurality of piezoelectric elements by a plurality of dividing grooves 180 as second grooves of the present invention. That is to say, in this embodiment, after signal conductor 150, piezoelectric element 410, first acoustic matching layer 421, grounding conductor 210, and second acoustic matching layer 422 have been pressed against rear-surface backing material 430 formed into a curved surface shape, and have been formed into a curved surface shape, second acoustic matching layer 422, grounding conductor 210, first acoustic matching layer 421, piezoelectric element 410, signal conductor 150, and part of rear-surface backing material 430 are divided into a sequence of a plurality of piezoelectric elements by the above plurality of dividing grooves 180 in line with the signal conductor 150 pattern in the X direction (a direction orthogonal to the Y direction). This direction is the electronic scanning direction. The plurality of dividing grooves 180 are filled with a material such as silicone rubber with lower hardness than the epoxy resin or suchlike material filling grooves 160.

With regard to the material that fills grooves 160, since a plurality of piezoelectric bodies (individual parts of piezoelectric element 410 divided by grooves 160) arrayed in the Y direction are made to oscillate integrally, there is no problem if the oscillation of the individual Y-direction piezoelectric bodies leaks via the filling material such as epoxy resin filling grooves 160, and therefore the filling material of grooves 160 may be of a high degree of hardness. However, with regard to the sequence of a plurality of piezoelectric elements 410 divided in the X direction, when electrical signals are supplied to piezoelectric elements 410 via signal conductors 150 and grounding conductor 210, respective delays are applied to perform phase control of the electrical signals and deflect or converge the ultrasonic waves, and therefore it is necessary to keep leakage of ultrasonic wave oscillation between piezoelectric elements 410 small. Therefore, it is necessary for the filling material of dividing grooves 180 dividing signal conductor 150, piezoelectric element 410, first acoustic matching layer 421, grounding conductor 210, and second acoustic matching layer 422 in the X direction to be a material of lower hardness, and less prone to transmission of oscillation, than the filling material of grooves 160 dividing piezoelectric element 410 in the Y direction.

Lastly, propagating medium 130 is provided on second acoustic matching layer 422 as necessary. Polyurethane resin, butadiene rubber, silicone rubber, or the like, having an acoustic impedance value close to that of a living organism and a small ultrasonic wave attenuation coefficient, may be used for propagating medium 130. Also, since ultrasonic waves are refracted at the boundary if the sonic speed of propagating medium 130 differs from the sonic speed of a living organism, it is necessary to take this refraction into consideration as well as taking the curved surface shape of second acoustic matching layer 422 into consideration when setting the focal distance of ultrasonic waves.

Thus, according to this embodiment, a configuration is employed in which grooves 160 are provided and these are used to form piezoelectric element 410 and first acoustic matching layer 421 of varying thickness into a curved surface shape, enabling ultrasonic waves to be converged without an acoustic lens, and a configuration is employed in which signal conductor 150 is provided on a signal electrode surface of piezoelectric element 410, and grounding conductor 210 is provided on the surface of first acoustic matching layer 421 on the opposite side from piezoelectric element 410. Consequently, a configuration can be implemented that enables high sensitivity and wideband frequency characteristics to be obtained and high reliability to be achieved, making it possible to implement a high-quality, stable ultrasonic probe. Furthermore, an ultrasonic wave beam can be narrowly focused, and an ultrasonic wave beam can be deflected, enabling an ultrasonic probe to be implemented that provides a high-resolution ultrasonic image with high sensitivity.

In this embodiment, a case has been described in which piezoelectric elements 410 are arrayed linearly (in a planar configuration) in the X direction, but the shape of the X-direction array is not limited to this. For example, the same kind of effect can also be obtained if piezoelectric elements are arrayed in a convex or concave curved surface shape in the X direction.

In this embodiment, a case has been described in which a conductive material is used for first acoustic matching layer 421, but the present invention is not limited to this. For example, the same kind of effect can also be obtained if the first acoustic matching layer is a composite body comprising an insulator and a conductor, the first acoustic matching layer is divided by first grooves (grooves 160) in the Y direction, and a conductor is provided on part of the first acoustic matching layer so that the divided parts become electrically conductive in the Z direction.

In this embodiment, a case has been described in which piezoelectric element 410 and acoustic matching layers 420 are formed into a concave curved surface shape in the Y direction on the test subject side, but the curved surface shape is not limited to this. For example, the same kind of effect can also be obtained if the piezoelectric element and acoustic matching layers are made convex in the Y direction on the test subject side, and also if a curved surface having a single radius of curvature or a curved surface having a plurality of radii of curvature such that the radius of curvature changes gradually is used, irrespective of concavity or convexity.

In this embodiment, a case has been described in which acoustic matching layers comprise two layers, but the present invention is not limited to this. For example, the same kind of effect can also be obtained if acoustic matching layers comprise three or more layers.

In this embodiment, a case has been described in which grounding conductor 210 is provided on conductive first acoustic matching layer 421, but the present invention is not limited to this. For example, when the first and second acoustic matching layers are conductors, the same kind of effect can also be obtained if a grounding conductor is provided on the second acoustic matching layer.

The disclosure of Japanese Patent Application No. 2006-125536, filed on Apr. 28, 2006, including the specification, drawings and abstract, is incorporated herein by reference in its entirety.

INDUSTRIAL APPLICABILITY

An ultrasonic probe according to the present invention can be used in various medical fields in which ultrasonic diagnosis of a human body or such like test subject is performed, and in the industrial field for the purpose of internal flaw inspection of materials or structures.

What is claimed is:

1. An ultrasonic probe comprising:
    a plurality of piezoelectric elements arrayed in a predetermined direction;
    an acoustic matching layer provided on a first surface of each individual piezoelectric element;
    a plurality of first grooves piercing both the first surface and a second surface on an opposite side from the first surface of each individual piezoelectric element, completely dividing each individual piezoelectric element and at least a part of the acoustic matching layer provided on the first surface of each individual piezoelectric element in a lengthwise direction orthogonal to the predetermined direction; and
    a conductor provided on the second surface of each individual piezoelectric element,
    wherein the acoustic matching layer, the plurality of piezoelectric elements, and the conductor are formed into a curved surface shape in the lengthwise direction.

2. The ultrasonic probe according to claim 1, wherein the acoustic matching layer has at least two or more layers including a first acoustic layer on each individual piezoelectric element, and the first grooves are provided in the first acoustic matching layer in such a way as to pierce only a surface on the piezoelectric element side.

3. The ultrasonic probe according to claim 1, wherein the acoustic matching layer has at least two or more layers including a first acoustic layer on each individual piezoelectric element, and the first grooves are provided in the first acoustic matching layer in such a way as to pierce both a surface on the piezoelectric element side and a surface on an opposite side from the piezoelectric element side.

4. The ultrasonic probe according to claim 1, further comprising a rear-surface backing material that supports the acoustic matching layer, each individual piezoelectric element, and the signal conductor,
    wherein a surface of the rear-surface backing material on the piezoelectric element side is formed into a curved surface shape in the lengthwise direction.

5. The ultrasonic probe according to claim 1, wherein each individual piezoelectric element and the acoustic matching layer on which the first grooves are provided are of varying thickness in the lengthwise direction.

6. The ultrasonic probe according to claim 1, further comprising a plurality of second grooves that separate at least a part of the acoustic matching layer, each individual piezoelectric element, and the conductor in the predetermined direction, wherein spacing of the first grooves and spacing of the second grooves are the same.

7. The ultrasonic probe according to claim 1, further comprising a second groove that separates at least a part of the acoustic matching layer, each individual piezoelectric element, and the conductor in the predetermined direction, wherein the first grooves and the second groove are filled with different materials.

8. The ultrasonic probe according to claim 7, wherein a material filling the first grooves is of higher hardness than a material filling the second groove.

9. The ultrasonic probe according to claim 7, wherein a material filling the first grooves is epoxy resin or polyurethane resin.

10. The ultrasonic probe according to claim 7, wherein a material filling the second groove is silicone rubber.

11. The ultrasonic probe according to claim 1, wherein the acoustic matching layer, each individual piezoelectric element, and the signal conductor are formed into a concave curved surface shape in the lengthwise direction.

12. The ultrasonic probe according to claim 1, wherein the acoustic matching layer has at least two or more layer including a first acoustic layer on each individual piezoelectric element, and the first acoustic matching layer is a conductor or in part a conductor.

13. The ultrasonic probe according to claim 1, wherein the acoustic matching layer has at least two or more layer including a first acoustic layer on each individual piezoelectric element, and the acoustic matching layers apart from the first acoustic matching layer are a material having flexibility allowing conformance to a curved surface shape.

14. The ultrasonic probe according to claim 1, wherein a material of at least an acoustic matching layer laid uppermost among the acoustic matching layers is a rubber elastic solid having a sonic speed value of 1650 msec or below.

15. The ultrasonic probe according to claim 1, wherein the acoustic matching layer has at least two or more sub-layers, and further comprising a second groove that separates at least one of the sub-layers, each individual piezoelectric element, and the conductor in the predetermined direction.

16. The ultrasonic probe according to claim 1, wherein the conductor is a signal conductor.

17. The ultrasonic probe according to claim 1, wherein the conductor is provided continuously in the lengthwise direction.

18. An ultrasonic probe comprising:
    a plurality of piezoelectric elements arrayed in a predetermined direction;
    at least two or more acoustic matching layers provided on a first surface of each individual piezoelectric element;
    a plurality of first grooves that pierce both the first surface and a second surface on an opposite side from the first surface of each individual piezoelectric element, extend from each individual piezoelectric element and into at least a first acoustic matching layer among the two or more acoustic matching layers, and completely divide each individual piezoelectric element in a lengthwise direction orthogonal to the predetermined direction;
    a signal conductor provided on the second surface of each individual piezoelectric element;
    a rear-surface backing material that supports each individual acoustic matching layer, piezoelectric element, and signal conductor; and
    a plurality of second grooves that separate at least each first acoustic matching layer among the two or more acoustic matching layers, piezoelectric element, and signal conductor in the predetermined direction,
    wherein each acoustic matching layer, piezoelectric element, and signal conductor are formed into a curved surface shape in the lengthwise direction.

19. The ultrasonic probe according to claim 18, wherein the first grooves are provided in the first acoustic matching layer in such a way as to pierce only a surface on the piezoelectric element side.

20. The ultrasonic probe according to claim 18, wherein the first grooves are provided in the first acoustic matching layer in such a way as to pierce both a surface on the piezoelectric element side and a surface on an opposite side from the piezoelectric element side.

21. The ultrasonic probe according to claim 18, further comprising a rear-surface backing material that supports the acoustic matching layer, each individual piezoelectric element, and the signal conductor, wherein a surface of the rear-surface backing material on the piezoelectric element side is formed into a curved surface shape in the lengthwise direction.

22. The ultrasonic probe according to claim 18, wherein each individual piezoelectric element and the acoustic matching layer on which the first grooves are provided are of varying thickness in the lengthwise direction.

23. The ultrasonic probe according to claim 18, wherein spacing of the first grooves and spacing of the second grooves are the same.

24. The ultrasonic probe according to claim 18, wherein the first grooves and the second grooves are filled with different materials.

25. The ultrasonic probe according to claim 24, wherein a material filling the first grooves is of higher hardness than a material filling the second grooves.

26. The ultrasonic probe according to claim 24, wherein a material filling the first grooves is epoxy resin or polyurethane resin.

27. The ultrasonic probe according to claim 24, wherein a material filling the second grooves is silicone rubber.

28. The ultrasonic probe according to claim 18, wherein the acoustic matching layer, each individual piezoelectric element, and the signal conductor are formed into a concave curved surface shape in the lengthwise direction.

29. The ultrasonic probe according to claim 18, wherein the first acoustic matching layer is a conductor or in part a conductor.

30. The ultrasonic probe according to claim 18, wherein a material of at least an acoustic matching layer laid uppermost among the acoustic matching layers is a rubber elastic solid having a sonic speed value of 1650 msec or below.

31. An ultrasonic probe comprising:
a plurality of piezoelectric elements arrayed in a predetermined direction;
a first acoustic matching layer provided on a first surface of each individual piezoelectric element;
a grounding conductor provided on the first acoustic matching layer;
a second acoustic matching layer provided on the grounding conductor;
a plurality of first grooves that are provided in each individual piezoelectric element and at least the first acoustic matching layer, pierce both the first surface and a second surface on an opposite side from the first surface of each individual piezoelectric element, and completely divide each individual piezoelectric element in a lengthwise direction orthogonal to the predetermined direction;
a signal conductor provided on the second surface of each individual piezoelectric element;
a rear-surface backing material that supports the two acoustic matching layers, the grounding conductor, each individual piezoelectric element, and the signal conductor; and
a plurality of second grooves that separate at least the first acoustic matching layer of the two acoustic matching layers, the grounding conductor, each individual piezoelectric element, and the signal conductor in the predetermined direction,
wherein the two acoustic matching layers, the grounding conductor, each individual piezoelectric element, and the signal conductor are formed into a curved surface shape in the lengthwise direction.

32. The ultrasonic probe according to claim 31, wherein the first grooves are provided in the first acoustic matching layer in such a way as to pierce only a surface on the piezoelectric element side.

33. The ultrasonic probe according to claim 31, wherein the first grooves are provided in the first acoustic matching layer in such a way as to pierce both a surface on the piezoelectric element side and a surface on an opposite side from the piezoelectric element side.

34. The ultrasonic probe according to claim 31, further comprising a rear-surface backing material that supports the acoustic matching layer, each individual piezoelectric element, and the signal conductor,
wherein a surface of the rear-surface backing material on the piezoelectric element side is formed into a curved surface shape in the lengthwise direction.

35. The ultrasonic probe according to claim 31, wherein each individual piezoelectric element and the acoustic matching layer on which the first grooves are provided are of varying thickness in the lengthwise direction.

36. The ultrasonic probe according to claim 31, wherein spacing of the first grooves and spacing of the second grooves are the same.

37. The ultrasonic probe according to claim 31, wherein the first grooves and the second grooves are filled with different materials.

38. The ultrasonic probe according to claim 37, wherein a material filling the first grooves is of higher hardness than a material filling the second grooves.

39. The ultrasonic probe according to claim 37, wherein a material filling the first grooves is epoxy resin or polyurethane resin.

40. The ultrasonic probe according to claim 37, wherein a material filling the second grooves is silicone rubber.

41. The ultrasonic probe according to claim 31, wherein the acoustic matching layer, each individual piezoelectric element, and the signal conductor are formed into a concave curved surface shape in the lengthwise direction.

42. The ultrasonic probe according to claim 31, wherein the first acoustic matching layer is a conductor or in part a conductor.

43. The ultrasonic probe according to claim 31, wherein a material of at least an acoustic matching layer laid uppermost among the acoustic matching layers is a rubber elastic solid having a sonic speed value of 1650 msec or below.

44. An ultrasonic probe comprising:
a plurality of piezoelectric elements arrayed in a predetermined direction;
a first acoustic matching layer provided on a first surface of each individual piezoelectric element;
a grounding conductor provided on the first acoustic matching layer;
a second acoustic matching layer provided on the grounding conductor;
a third acoustic matching layer provided on the second acoustic matching layer;
a plurality of first grooves that are provided in each individual piezoelectric element and at least the first acoustic matching layer, pierce both the first surface and a second surface on an opposite side from the first surface of each individual piezoelectric element, and completely divide each individual piezoelectric element in a lengthwise direction orthogonal to the predetermined direction;
a signal conductor provided on the second surface of each individual piezoelectric element;

a rear-surface backing material that supports the three acoustic matching layers, the grounding conductor, each individual piezoelectric element, and the signal conductor; and a plurality of second grooves that separate at least the first acoustic matching layer among the three acoustic matching layers, the grounding conductor, each individual piezoelectric element, and the signal conductor in the predetermined direction, wherein the three acoustic matching layers, the grounding conductor, each individual piezoelectric element, and the signal conductor are formed into a curved surface shape in the lengthwise direction.

45. The ultrasonic probe according to claim 44, wherein a material of the third acoustic matching layer is a rubber elastic solid having a sonic speed value of 1650 msec or below.

46. The ultrasonic probe according to claim 44, wherein the first grooves are provided in the first acoustic matching layer in such a way as to pierce only a surface on the piezoelectric element side.

47. The ultrasonic probe according to claim 44, wherein the first grooves are provided in the first acoustic matching layer in such a way as to pierce both a surface on the piezoelectric element side and a surface on an opposite side from the piezoelectric element side.

48. The ultrasonic probe according to claim 44, further comprising a rear-surface backing material that supports the acoustic matching layer, each individual piezoelectric element, and the signal conductor, wherein a surface of the rear-surface backing material on the piezoelectric element side is formed into a curved surface shape in the lengthwise direction of the piezoelectric element.

49. The ultrasonic probe according to claim 44, wherein each individual piezoelectric element and the acoustic matching layer on which the first grooves are provided are of varying thickness in the lengthwise direction.

50. The ultrasonic probe according to claim 44, wherein spacing of the first grooves and spacing of the second grooves are the same.

51. The ultrasonic probe according to claim 44, wherein the first grooves and the second grooves are filled with different materials.

52. The ultrasonic probe according to claim 51, wherein a material filling the first grooves is of higher hardness than a material filling the second grooves.

53. The ultrasonic probe according to claim 51, wherein a material filling the first grooves is epoxy resin or polyurethane resin.

54. The ultrasonic probe according to claim 51, wherein a material filling the second grooves is silicone rubber.

55. The ultrasonic probe according to claim 44, wherein the acoustic matching layer, each individual piezoelectric element, and the signal conductor are formed into a concave curved surface shape in the lengthwise direction of the piezoelectric element.

56. The ultrasonic probe according to claim 44, wherein the first acoustic matching layer is a conductor or in part a conductor.

57. The ultrasonic probe according to claim 44, wherein a material of at least an acoustic matching layer laid uppermost among the acoustic matching layers is a rubber elastic solid having a sonic speed value of 1650 msec or below.

* * * * *